(12) United States Patent
Witherbee et al.

(10) Patent No.: US 11,073,230 B2
(45) Date of Patent: Jul. 27, 2021

(54) PIPE SADDLE

(71) Applicant: Eaton Intelligent Power Limited, Dublin (IE)

(72) Inventors: Martin Lee Witherbee, Godfrey, IL (US); Robert John Reese, Edwardsville, IL (US)

(73) Assignee: Eaton Intelligent Power Limited, Dublin (IE)

( * ) Notice: Subject to any disclaimer, the term of this patent is extended or adjusted under 35 U.S.C. 154(b) by 20 days.

(21) Appl. No.: 16/511,137

(22) Filed: Jul. 15, 2019

(65) Prior Publication Data

US 2020/0018426 A1    Jan. 16, 2020

Related U.S. Application Data

(60) Provisional application No. 62/698,188, filed on Jul. 15, 2018.

(51) Int. Cl.
| | |
|---|---|
| *F16L 3/04* | (2006.01) |
| *F16L 41/12* | (2006.01) |
| *F16L 3/24* | (2006.01) |
| *F16L 3/14* | (2006.01) |

(52) U.S. Cl.
CPC .............. *F16L 3/04* (2013.01); *F16L 3/14* (2013.01); *F16L 3/24* (2013.01); *F16L 41/12* (2013.01)

(58) Field of Classification Search
CPC ....... F16L 3/04; F16L 3/14; F16L 3/24; F16L 41/12
See application file for complete search history.

(56) References Cited

U.S. PATENT DOCUMENTS

| | | | |
|---|---|---|---|
| 3,599,918 A * | 8/1971 | Patchett | F21S 4/10 248/85 |
| D228,738 S | 10/1973 | Rubin de Cervin | |
| 4,017,046 A * | 4/1977 | Hicks | F16L 3/16 248/55 |
| 4,403,759 A * | 9/1983 | Hicks | F16L 3/18 248/55 |
| D306,553 S | 3/1990 | Rumpel | |
| 4,974,128 A * | 11/1990 | Prickett | F21V 21/08 362/145 |
| 5,004,199 A * | 4/1991 | Suk | H02G 3/125 220/3.9 |
| D326,927 S | 6/1992 | Catalina | |
| D363,016 S | 10/1995 | Sipprelle, III et al. | |

(Continued)

FOREIGN PATENT DOCUMENTS

WO    2017173047 A1    10/2017

*Primary Examiner* — Anita M King
(74) *Attorney, Agent, or Firm* — Stinson LLP

(57) ABSTRACT

A pipe saddle includes a saddle body having an interior surface with a generally U-shaped cross-sectional shape defining an interior configured to receive a pipe therein. The saddle body includes a bottom wall portion. A support clip is included on the bottom wall portion of the saddle body. The support clip includes a side wall extending downward. A resiliently deflectable lower arm extends outward from a lower end of the side wall and generally opposing the bottom wall portion. The resiliently deflectable lower arm includes a catch at a free end thereof. The resiliently deflectable lower arm is configured to snap onto a support structure to attach the pipe saddle to the support structure.

17 Claims, 25 Drawing Sheets

(56) References Cited

U.S. PATENT DOCUMENTS

| | | |
|---|---|---|
| D364,555 S | 11/1995 | Neiert |
| D375,453 S | 11/1996 | Fleck |
| 5,642,557 A | 7/1997 | Clews |
| 5,816,684 A | 10/1998 | Yu |
| D426,577 S | 6/2000 | Mackey et al. |
| D438,453 S | 3/2001 | Nelson et al. |
| 6,224,025 B1 | 5/2001 | Alvarez |
| D443,198 S | 6/2001 | Snyder |
| D473,128 S | 4/2003 | Costa |
| 6,691,742 B1 | 2/2004 | Cooper |
| D550,540 S | 9/2007 | Nawrocki |
| D554,978 S | 11/2007 | Radke |
| D561,552 S | 2/2008 | Tsuchida |
| D563,771 S | 3/2008 | Prechtel et al. |
| 7,464,908 B2 * | 12/2008 | Files .................. F41B 5/066 124/86 |
| 7,677,505 B2 | 3/2010 | Deichman |
| 7,744,041 B2 | 6/2010 | Boudreau |
| D637,457 S | 5/2011 | Thompson |
| 8,038,105 B2 | 10/2011 | Deichman |
| 8,074,943 B2 | 12/2011 | Boudreau et al. |
| D669,135 S | 10/2012 | Garfinkle |
| 8,297,561 B1 | 10/2012 | Montplaisir |
| D672,004 S | 12/2012 | Stracener |
| D691,032 S | 10/2013 | Chen |
| 8,763,960 B1 | 7/2014 | Moore et al. |
| D712,729 S | 9/2014 | Cushing |
| D713,242 S | 9/2014 | Magan |
| 8,833,705 B2 | 9/2014 | Bragagna et al. |
| 8,839,546 B2 | 9/2014 | Taylor |
| 8,915,110 B1 | 12/2014 | Moore et al. |
| 8,919,704 B2 | 12/2014 | Lee et al. |
| D736,768 S | 8/2015 | Kuwabara et al. |
| D740,110 S | 10/2015 | Luoma |
| D747,181 S | 1/2016 | Hikoyama |
| D747,636 S | 1/2016 | Maher |
| D753,468 S | 4/2016 | Weger |
| 9,360,139 B1 | 6/2016 | Clement et al. |
| D760,583 S | 7/2016 | Weilage |
| D773,696 S | 12/2016 | Molinelli |
| D782,928 S | 4/2017 | Takakuwa et al. |
| D784,118 S | 4/2017 | Reddy |
| D802,103 S | 11/2017 | Boudreau et al. |
| 9,808,845 B2 | 11/2017 | Rebholz et al. |
| D808,255 S | 1/2018 | Pittman |
| D810,536 S | 2/2018 | Hikoyama |
| 9,903,524 B2 | 2/2018 | Lange et al. |
| D813,660 S | 3/2018 | Tyner |
| D815,517 S | 4/2018 | Van Fleet |
| D821,188 S | 6/2018 | Smullen |
| D822,455 S | 7/2018 | Stahl et al. |
| D822,830 S | 7/2018 | Aten et al. |
| D823,095 S | 7/2018 | Stahl et al. |
| D824,756 S | 8/2018 | Fischer et al. |
| D830,149 S | 10/2018 | Pippus |
| D830,153 S | 10/2018 | Sadofsky |
| D836,428 S | 12/2018 | Pittman |
| D838,471 S | 1/2019 | Young |
| D854,192 S | 7/2019 | Rokvic |
| D868,574 S | 12/2019 | Pittman |
| D878,193 S * | 3/2020 | Witherbee .................. D8/396 |
| D881,688 S * | 4/2020 | Witherbee .................. D8/396 |
| D894,724 S * | 9/2020 | Witherbee .................. D8/396 |
| 2005/0116129 A1 | 6/2005 | Boudreau et al. |
| 2007/0114338 A1 | 5/2007 | Boudreau et al. |
| 2008/0203239 A1 | 8/2008 | Deichman |
| 2016/0208979 A1 | 7/2016 | Lange et al. |
| 2017/0015021 A1 | 1/2017 | Botsolas, Jr. et al. |
| 2017/0284589 A1 | 10/2017 | Boudreau et al. |
| 2020/0271241 A1* | 8/2020 | Juzak .................. F16L 3/133 |
| 2020/0278050 A1* | 9/2020 | Dodge .................. F16L 3/1226 |

* cited by examiner

PIPE SADDLE

CROSS-REFERENCE TO RELATED APPLICATION

This application claims the benefit of U.S. Provisional Application No. 62/698,188, filed Jul. 15, 2018, the entirety of which is hereby incorporated by reference.

FIELD OF THE DISCLOSURE

The present disclosure generally relates to a pipe saddle and more specifically to a pipe saddle for supporting a pipe in the building.

BACKGROUND OF THE DISCLOSURE

In the installation of pipes, such an insulated pipes, and the like in various types of buildings and in particular pipes associated with air conditioning, refrigeration and heating, such as may be employed in commercial and industrial establishments, conventional practice is that the pipes are hung from the ceiling by strap hangers (e.g., clevis hanger) or supported on struts configured as trapeze supports. A saddle or protector may be used to protect the pipe so that the pipe does not directly contact the strap hanger or the strut.

SUMMARY OF THE DISCLOSURE

In one aspect, a pipe saddle comprises a saddle body having an interior surface with a generally U-shaped cross-sectional shape defining an interior configured to receive a pipe therein. The saddle body includes a bottom wall portion. The pipe saddle includes a support clip on the bottom wall portion of the saddle body. The support clip includes a side wall extending downward, and a resiliently deflectable lower arm extending outward from a lower end of the side wall and generally opposing the bottom wall portion. The resiliently deflectable lower arm is configured to engage a support structure to attach the pipe saddle to the support structure. The support clip includes a securing component configured to secure the pipe saddle to the support structure.

In another aspect, a pipe saddle comprises a saddle body having an interior surface with a generally U-shaped cross-sectional shape defining an interior configured to receive a pipe therein. The saddle body includes a bottom wall portion. The pipe saddle includes a support clip on the bottom wall portion of the saddle body. The support clip includes a side wall extending downward, and a resiliently deflectable lower arm extending outward from a lower end of the side wall. The resiliently deflectable lower arm generally opposes the bottom wall portion. The resiliently deflectable lower arm includes a catch at a free end thereof. The resiliently deflectable lower arm is configured to snap onto a support structure to attach the pipe saddle to the support structure.

In another aspect, a pipe saddle comprises a saddle body having an exterior surface, and an interior surface with a generally U-shaped cross-sectional shape defining an interior configured to receive a pipe therein. The saddle boy has a longitudinal axis extending between opposite longitudinal ends. The pipe saddle includes at least one angular rib on the exterior surface of the saddle body. The at least one angular rib has a length extending between opposite upper and lower ends of the rib. At least an angular longitudinal portion of the at least one angular rib extends at an angle relative to a mid-length transverse plane extending transversely relative to the longitudinal axis at a mid-length of the saddle body.

In another aspect, a pipe saddle comprises a saddle body having an interior surface with a generally U-shaped cross-sectional shape defining an interior configured to receive a pipe therein. The saddle body includes a bottom wall portion and has a length extending between first and second ends of the saddle body. The pipe saddle includes a support clip on the bottom wall portion of the saddle body. The support clip includes an upper wall having longitudinal ends spaced apart along the length of the saddle body. The support clip is configured to snap onto a channel strut to attach the pipe saddle to the channel strut. The pipe saddle includes first and second strut-bearing ribs on the exterior surface of the saddle body. The first and second strut-bearing ribs intersect the upper wall of the support clip and extend upward therefrom. The first and second strut-bearing ribs intersect the upper wall at respective first and second support locations that are spaced apart from one another and from ends of the upper wall. The first and second support locations overlie respective first and second upper lips of the channel strut when the support clip is attached to the channel strut.

In another aspect, a pipe saddle comprises a saddle body having an interior surface with a generally U-shaped cross-sectional shape defining an interior configured to receive a pipe therein. The saddle body includes a bottom wall portion and has a longitudinal axis extending between opposite longitudinal ends of the saddle body. The pipe saddle includes a support retainer on the bottom wall portion of the saddle body. The support retainer includes a retainer strap having an attached end connected to the bottom wall portion and a free end selectively attachable to the saddle body via a snap latch. The support retainer is configured to capture a band of a hanger between the saddle body and the retainer strap.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DISCLOSURE

Figure 1:
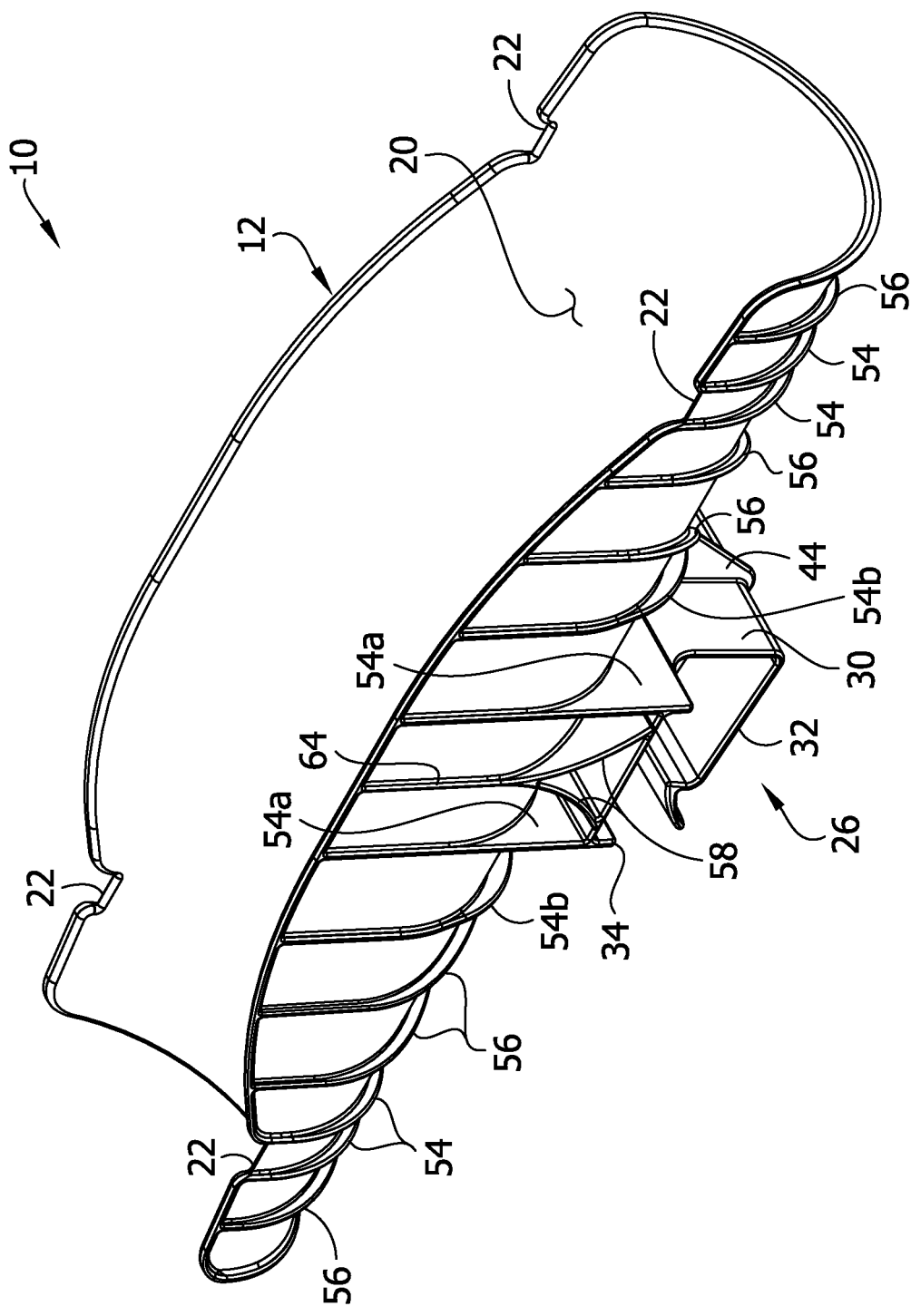
FIG. 1 is a perspective of a first embodiment of a pipe saddle.

Referring to FIGS. 1-5, an illustrated embodiment of a pipe saddle constructed according to the teachings of present disclosure is generally indicated reference numeral 10. The pipe saddle 10 generally receives a pipe P (e.g., an insulated pipe) that is secured to a support structure (e.g., a strut, beam, or other structure) to protect and support the pipe. In general, and as explained in more detail below, features of the pipe saddle 10 allow it to be quickly and readily coupled to the support structure, such as before attaching the pipe P to the support structure. Features of the pipe saddle 10 also provide structural support to the pipe saddle and, in turn, load bearing support to the pipe P supported by the saddle. Other features will be apparent throughout the following disclosure. It is understood that in one or more embodiments, the pipe saddle may include one or more, but not necessarily all, of the features described herein below.

Referring still to FIGS. 1-5, the illustrated pipe saddle 10 comprises a saddle body, generally indicated at 12, having opposite first and second longitudinal ends, a length L1 extending between the first and second longitudinal ends, opposite longitudinal end portions 13, and an intermediate longitudinal portion 14 between the longitudinal end portions 13. The saddle body 12 is generally U-shaped in cross section (i.e., transverse to the length) along the length L1 of the body. In particular, the saddle body 12 comprises a bottom wall portion 15 having a generally arcuate cross-sectional shape, and opposing side wall portions 16 extending upward from respective opposite arcuate ends of the bottom wall portion. Together, the bottom wall portion 15 and the side wall portions 16 define an interior surface of the saddle body that is generally U-shape in cross section and is smooth and continuous. The U-shaped interior surface defines a U-shaped channel 20 sized and shaped to receive, support, and protect a pipe P (e.g., a pipe with insulation I) therein. The interior surface at the bottom wall portion 15 is generally arcuate and may have a generally constant radius of curvature. In one example, the interior surface at the bottom wall portion 15 extends about 180 degrees about a center point CP of the radius of curvature of the interior surface. In this way, the bottom wall portion 15 generally cradles or cups the pipe P (e.g., insulation I on pipe) received in the channel 20. The interior surface at the opposing side wall portions 16 may extend linearly upward or at a constant or non-constant radius of curvature that is different (e.g., less than; flatter) than the radius of curvature at the bottom wall portion 15. In one example, the interior surface at the opposing side wall portions 16 may flare outward away from one another to provide an enlarged entrance to facilitate insertion of the pipe P in the channel 20. The interior surface of the bottom wall portion 15 adjacent the longitudinal ends of the saddle body 12 extend downward (e.g., fall off) toward the corresponding longitudinal end to inhibit the longitudinal ends from scraping the insulation I on an insulated pipe P received in the saddle 10. In the illustrated embodiment, the shape of the exterior surface defined by the bottom wall portion 15 and the side wall portions 16 generally corresponds to the shape of the interior surface, although in other embodiments, the exterior surface may have a different shape. Moreover, the thickness of the saddle body 12 between the interior and exterior surfaces is generally uniform along its length and it cross section, although in other embodiments the thickness may not be uniform.

Figure 2:
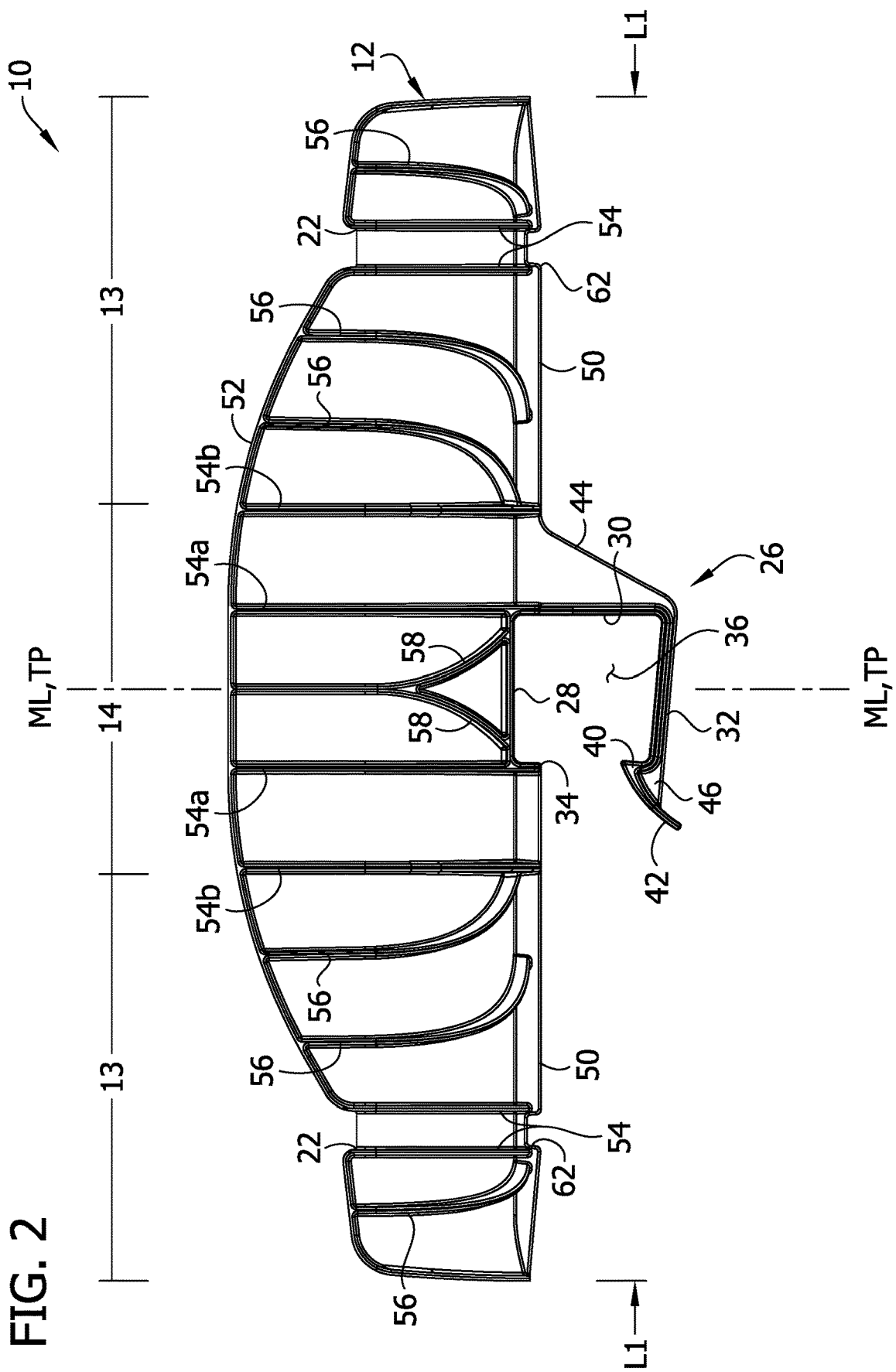
FIG. 2 is a side view of the pipe saddle.

As shown in FIGS. 1 and 2, in the illustrated embodiment, the side wall portions 16 are non-uniform along the length L1 of the saddle body 12. In particular, upper ends of the side wall portions 16 have generally convex shapes so that the side wall portions have an apex or maximum height at a mid-length ML of the saddle body 12. In this way, the side wall portions 16 oppose an upper portion of the pipe P (e.g., pipe with insulation I) to provide protection. In addition, recesses 22 are formed in the upper ends of the side wall portions 16 at longitudinal end portions 13 of the saddle body 12. Straps (e.g., tie straps; not shown) may be received in the recesses 22 and wrapped around the pipe P and the pipe straddle 10 to secure the pipe P to the pipe saddle. The recesses 22 locate and capture the straps for the user.

The illustrated pipe saddle 10 further includes a support clip, generally indicated at 26, extending downward from the bottom wall portion 15 of the saddle body 12. The illustrated support clip 26 is configured to clip onto (e.g., snap-fit onto) a channel strut S or other support structure having a generally rectangular cross section. It is understood that the support clip 26 may be configured to clip onto another type of support. The illustrated support clip 26 comprises a generally rigid upper wall 28 at the bottom wall portion 15 of the saddle body 12 (e.g., extending in a plane generally tangent to the bottom portion at a bottom longitudinal axis BL), a generally rigid side wall 30 extending downward from one end of the upper wall (e.g., extending generally orthogonal to the upper wall), a resiliently deflectable lower arm 32 (e.g., a cantilevered snap-fit arm) extending from a lower end of the side wall in generally opposing relationship with the upper wall, and a generally rigid upper lip 34 extending downward from the upper wall at an end opposite the side wall. Together, the upper wall 28, the side wall 30, the lower arm 32, and the upper lip 34 define an interior space 36 configured to receive the strut S therein. The lower arm 32 is resiliently biased to extend in at an acute or upward angle relative to the side wall 30. The lower arm 32 engages the strut S when the strut is received in the interior space 36. In particular, the lower arm 32 is deflected by the strut S when the strut is received in the interior space 36. The support clip 26 includes a securing component configured to secure the pipe saddle 10 to the strut S. In the illustrated embodiment, a free end of the lower arm 32 includes a catch or hook 40, as the securing component, for engaging the strut S when the strut is received in the interior space 36. The free end of the lower arm 32 also includes a beveled lead-in lip 42 for engaging the strut S during attachment, as explained below. In other embodiments, the securing component may be a fastener that engages the strut S. Other securing components are within the scope of the present disclosure and the support clip may include more than one securing component. Respective free ends of the upper lip 34 and the lower arm 32 are spaced apart from one another heightwise to define a side opening leading to the interior space 36 of the clip 26. In the illustrated embodiment, the support clip 26 is integrally formed with the saddle body 12, such as by a molding process. In one or more embodiments, the support clip 26 may be otherwise secured to the saddle body 12.

Figure 6:
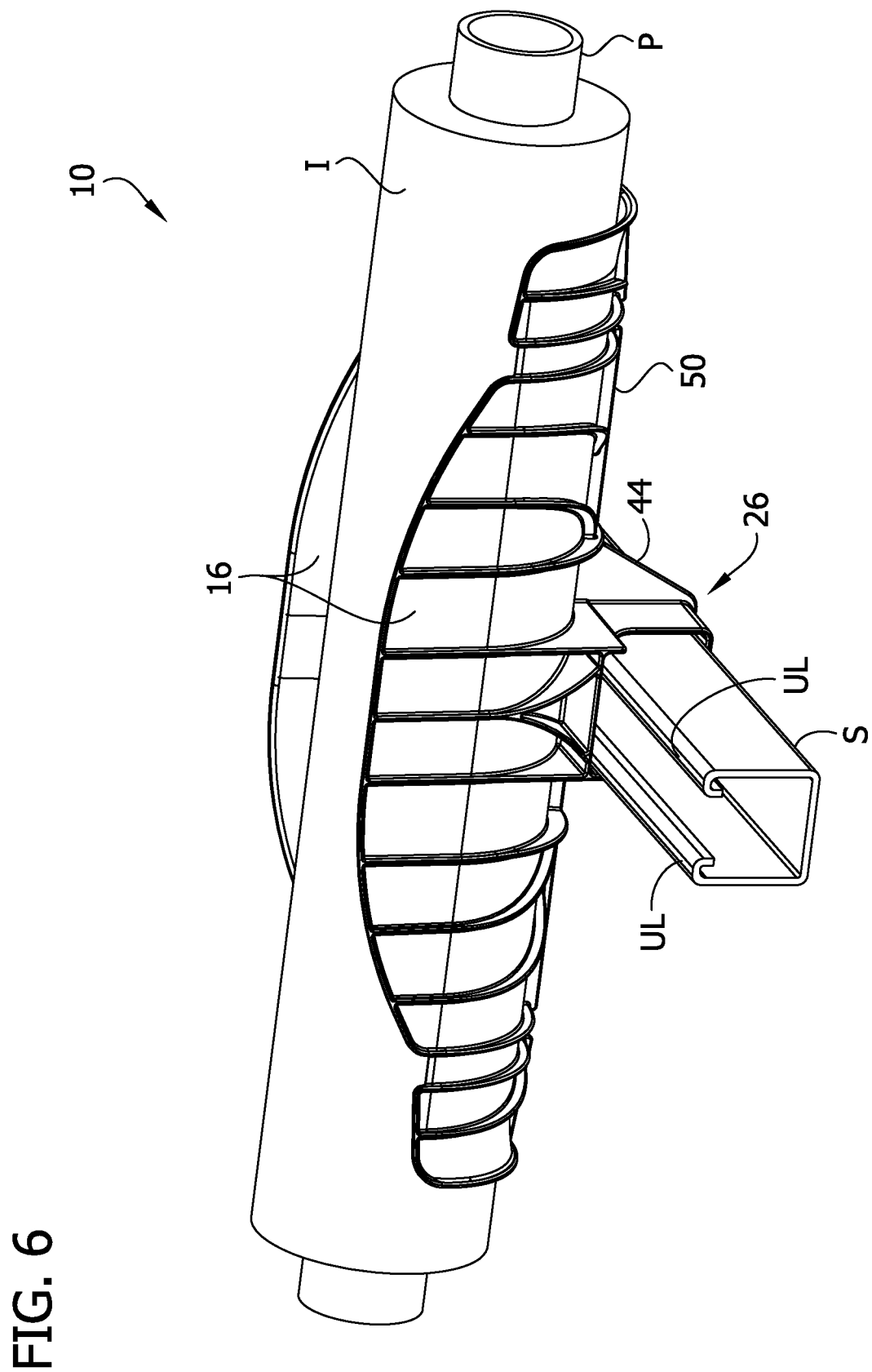
FIG. 6 is a perspective of the pipe saddle attached to a strut and supporting an insulated pipe.
Figure 7:
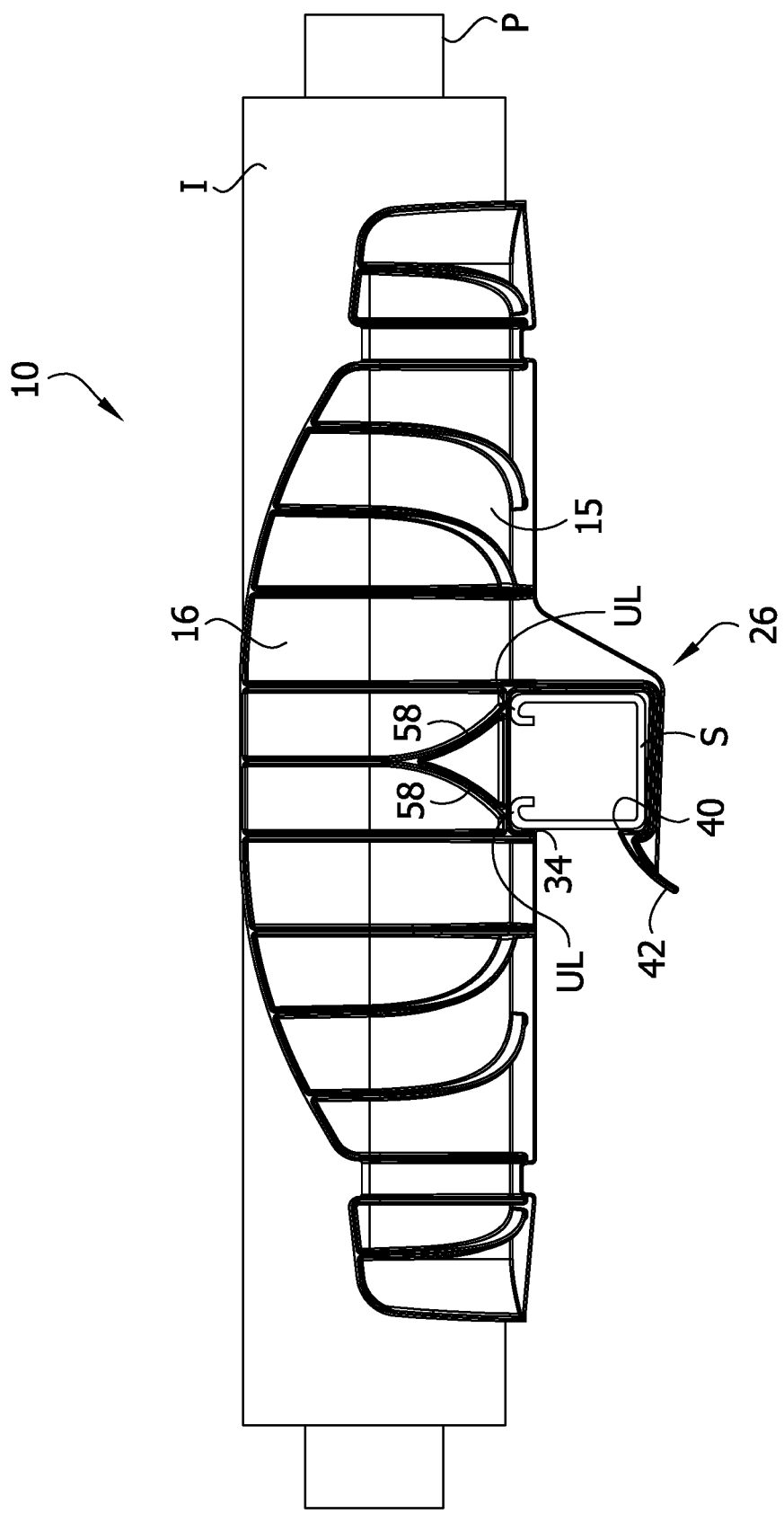
FIG. 7 is a side view of the pipe saddle attached to a strut and supporting an insulated pipe.
Figure 8:
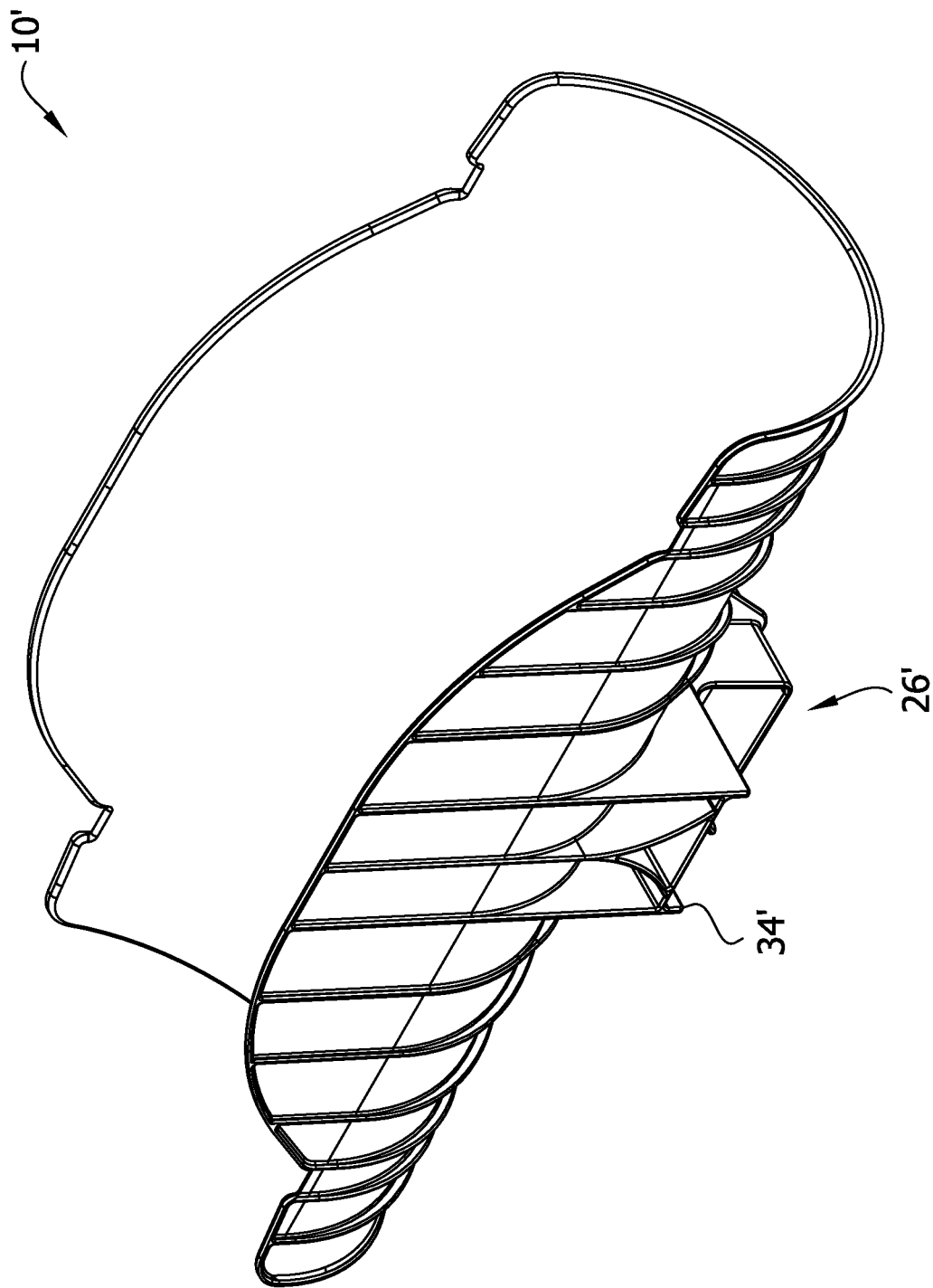
FIG. 8 is a perspective of a first variation of the first embodiment of the pipe saddle for supporting a pipe of a different diameter.
Figure 9:
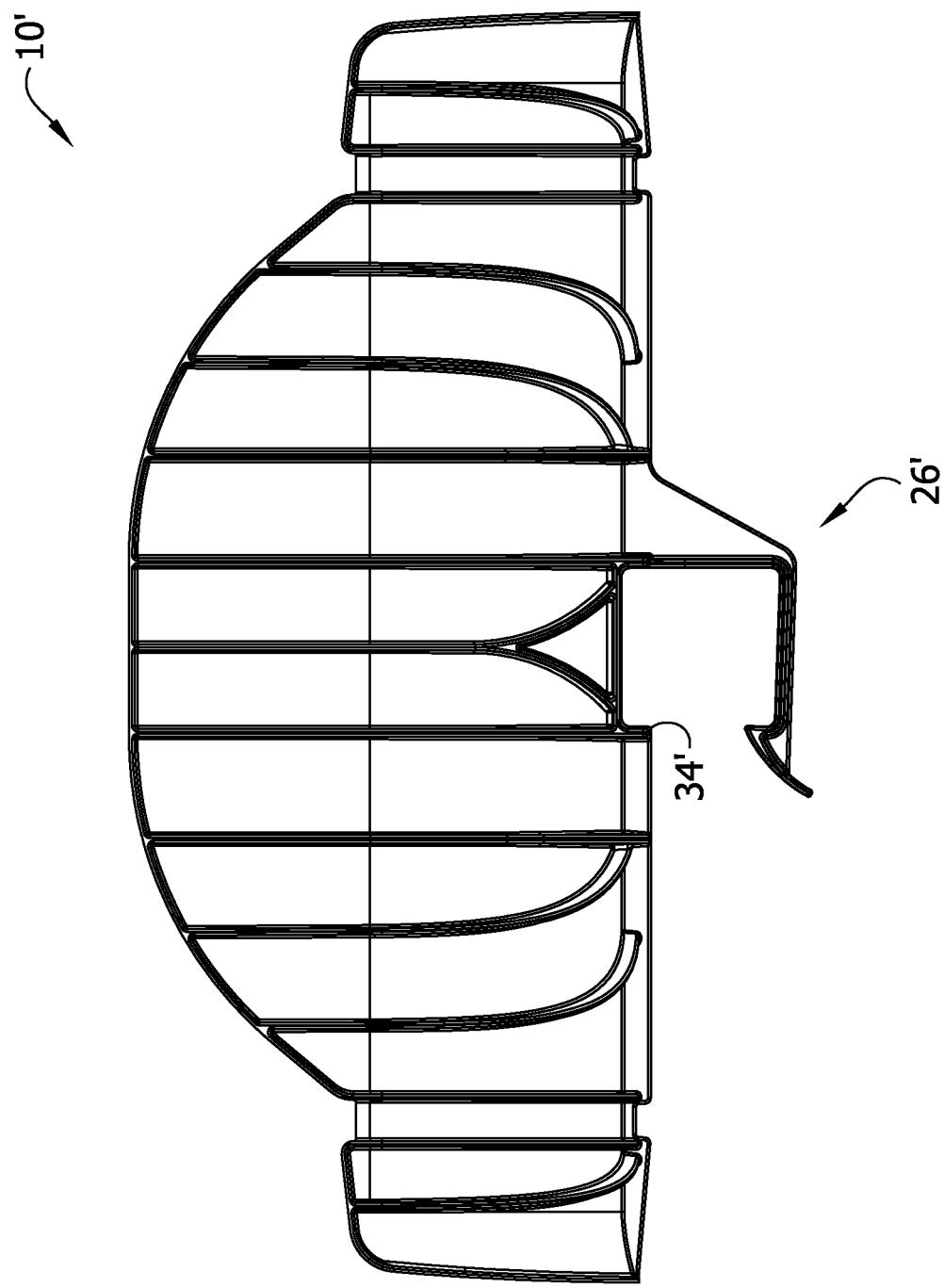
FIG. 9 is a side of the first variation.
Figure 10:
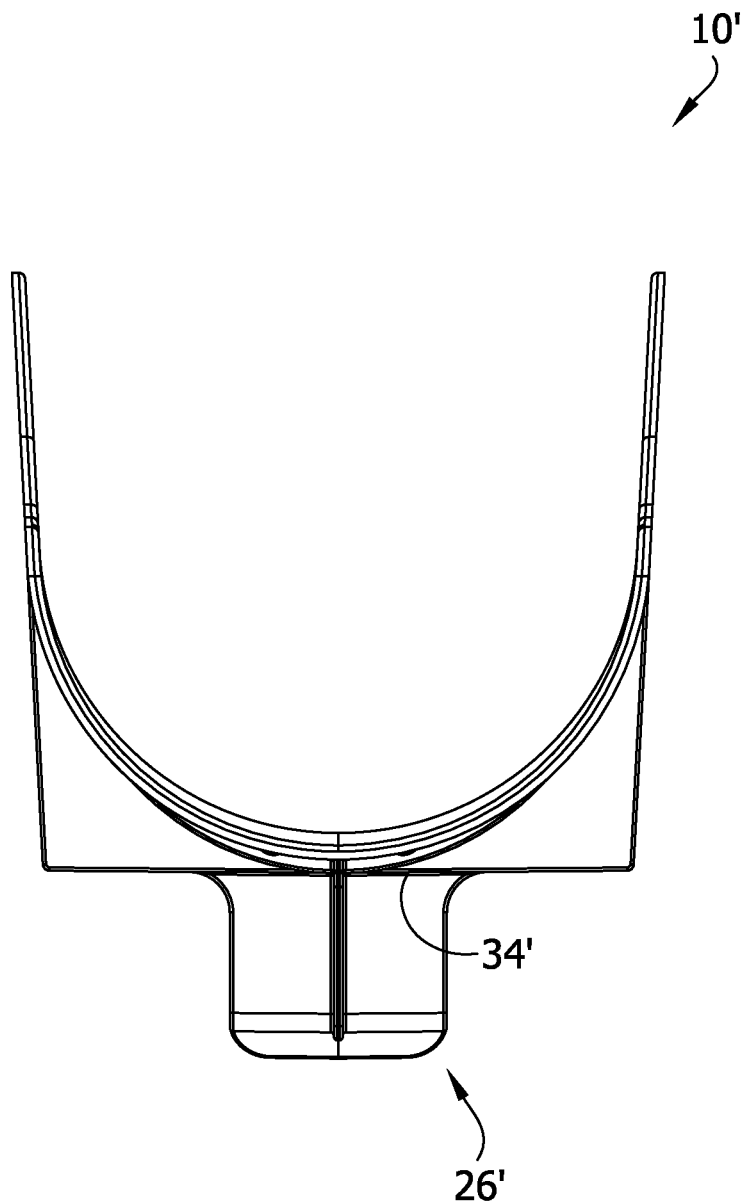
FIG. 10 is a longitudinal end view of the first variation.
Figure 11:
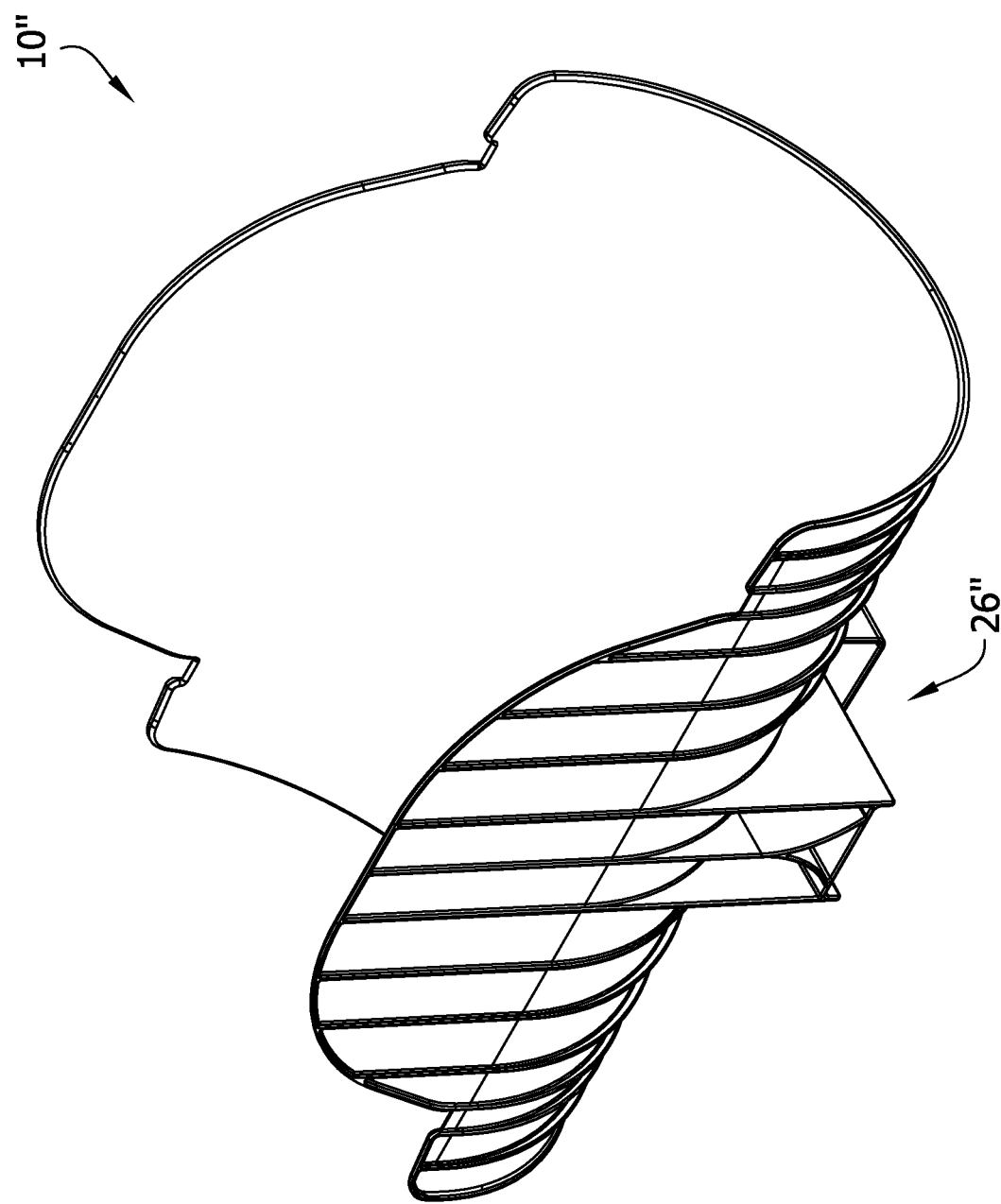
FIG. 11 is a perspective of a second variation of the first embodiment of the pipe saddle for supporting a pipe of a different diameter.
Figure 12:
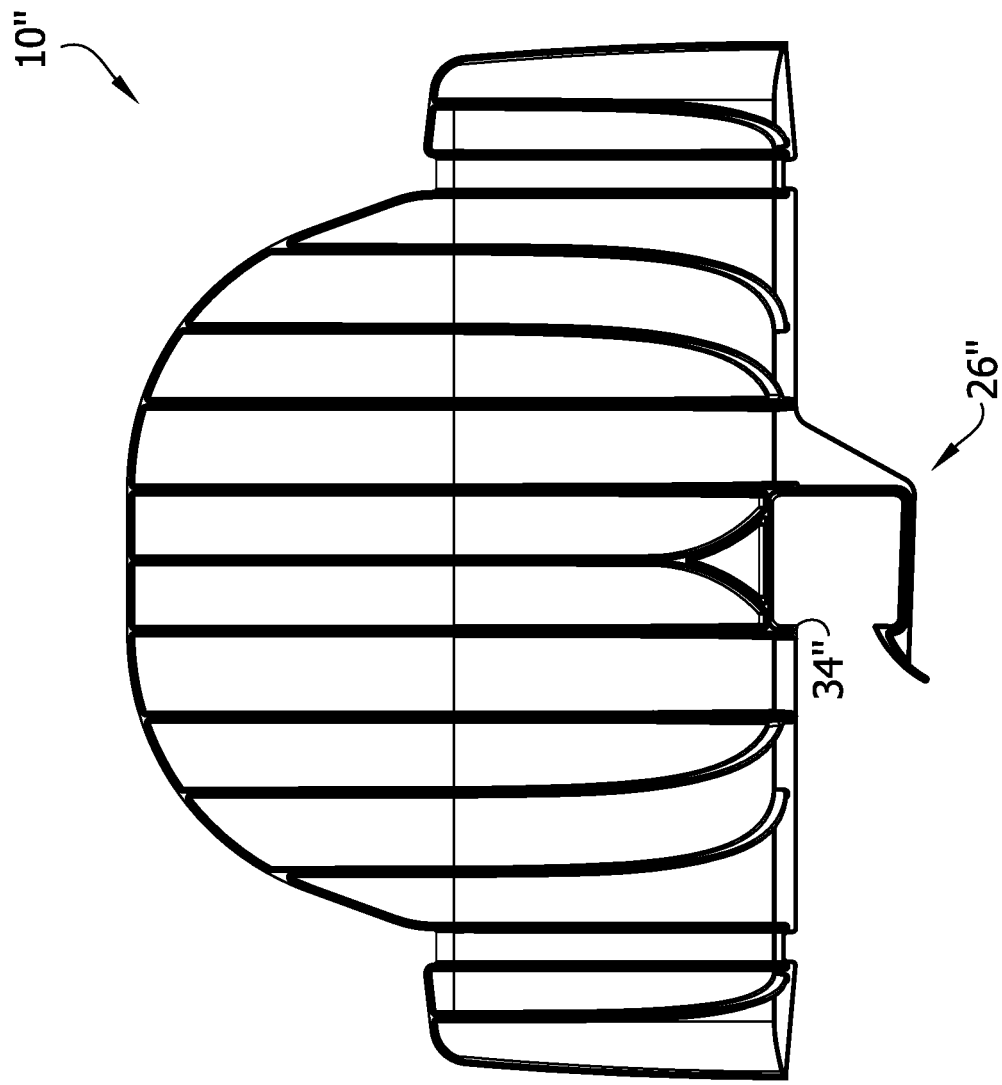
FIG. 12 is a side of the second variation.
Figure 13:
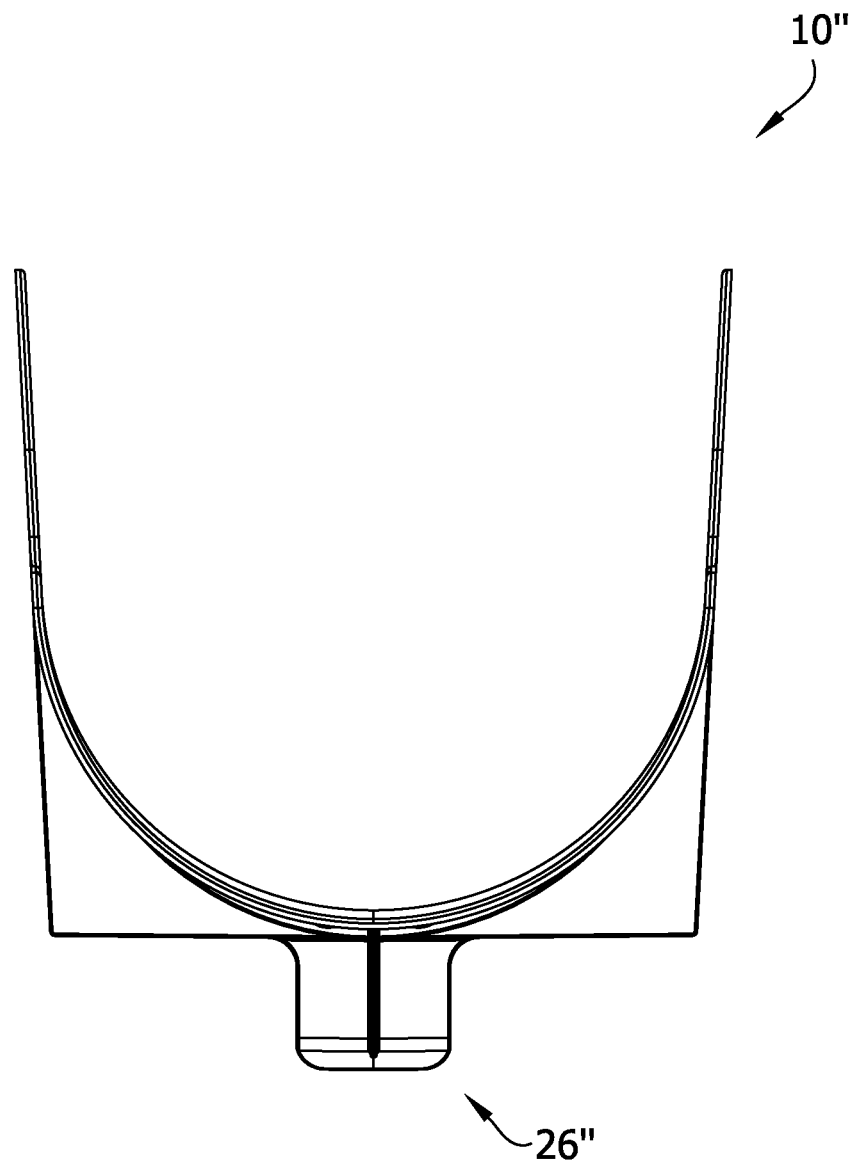
FIG. 13 is a longitudinal end view of the second variation.

As shown in FIGS. 6 and 7, the support clip 26 is configured to attach or couple to a strut S (or other support) by clipping (e.g., snap-fitting) the clip onto the strut. To attach the clip 26 to the strut S, the pipe saddle 10 is oriented relative to the strut so that the length L1 of the saddle body 12 is transverse (e.g., orthogonal) to the length of the strut and the opening of the clip 26 opposes a side of the strut. In this orientation, a portion of the saddle body 12 in front of the opening of the clip 26 will rest on the strut S (e.g., an upper side of the strut). After orientating, the pipe saddle 10 is moved toward the strut S so that strut engages the beveled lead-in lip 42 of the lower arm, causing the lead-in lip to ride along a corner (e.g., lower corner) of the strut and the lower arm 32 to resiliently deflect away from the upper wall 28 of the clip 26. The lower arm 32 generally resiliently deflects at its juncture with the side wall 30 so that the lower arm generally pivots about the juncture (e.g., a flexible hinge, a living hinge). In the illustrated embodiment, the resiliently deflectable lower arm 32 is also resiliently deflectable along generally its entire length. A gusset rib 44 extends from the side wall 30 to the bottom wall portion 15 of the saddle body 12 to provide rigidity to the side wall and inhibit bending of the side wall as the lower arm 32 resiliently deflects. A lower arm rib 46 extends long the lower arm 32 to provide rigidity to the lower arm rib. Even with the lower arm rib 46 (which is relatively small), the lower arm 32 is still resiliently deflectable along its length. In fact, the lower arm rib 46 strengthens the connection formed by the lower arm 32 and the strut S by increasing the amount of force applied by the lower arm against the support structure. The gusset rib 44 and the lower arm rib 46 are generally planar lying in a plane that is generally orthogonal to the side wall 30 and the lower arm 32, respectively. As the pipe saddle 10 is advanced further on the strut S in the direction orthogonal to the length of the strut S, the free end of the lower arm 32 rides along the lower side of the strut and the upper lip 34 rides along the upper side of the strut, whereby the strut further enters the interior space 36 of the clip 26. When the hook 40 of the lower arm 32 clears the lower side of the strut S, the lower arm resiliently deflects or rebounds toward the upper wall 28 (i.e., toward its biased position) and hooks onto (or captures) the lower corner of the strut S at the rear side and the lower side of the strut S. When the upper lip 34 clears the upper side of the strut S, the upper lip captures the upper corner of the strut at the rear side the upper side of the strut. Broadly, the upper lip 34 is also a securing component.

Accordingly, the illustrated support clip 26 allows the user to quickly and readily attach the pipe saddle 10 to the strut S. Moreover, because the clip opening is in the direction of or along the length L1 of the saddle body 12 (i.e., the clip opening is a side opening), the pipe saddle 10 can be more easily installed on the strut S after the pipe P and strut have been installed. The pipe P may be inserted into the pipe saddle 10 and the pipe saddle may be slid along the pipe toward the strut S, whereby the clip 26 engages and clips onto the strut S without lifting the pipe substantially upward from the strut. As an example, if the opening of the clip 26 was at the bottom of the clip (i.e., a bottom opening) rather than the side of the clip (i.e., a side opening), the pipe P would need to be raised the height of the clip in order to inert the strut S through the bottom opening. With the side opening of the present clip 26, however, to attach the pipe saddle 10 the pipe P only needs to be raised from the strut S the heightwise distance between the interior surface at the bottom longitudinal axis BL and the lower end of the upper lip 34.

Figure 5:
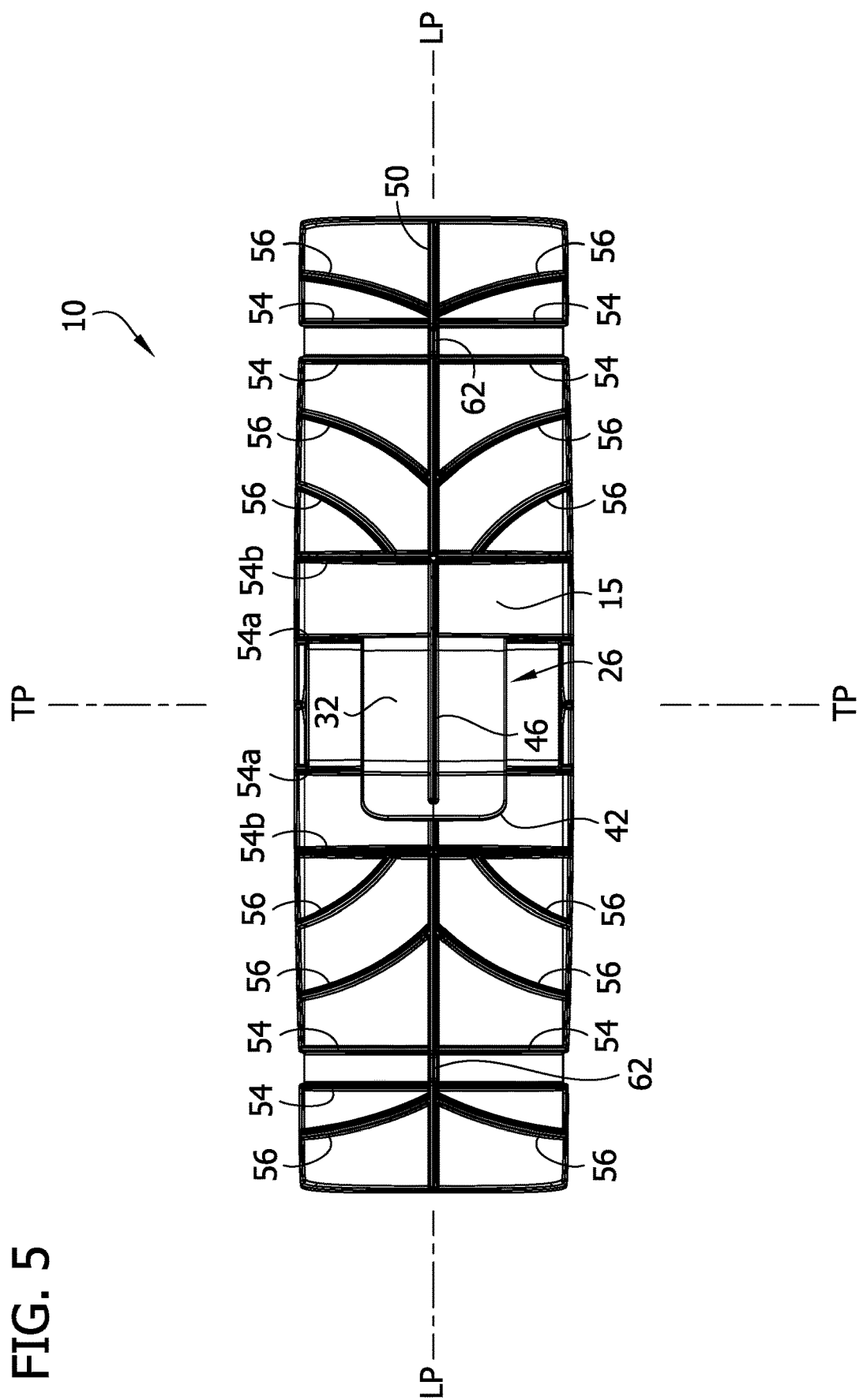
FIG. 5 is a bottom plan view of the pipe saddle.

Referring to FIGS. 1, 2, and 5, in the illustrated embodiment, the pipe saddle 10 further includes a plurality of ribs on the exterior surface of the saddle body 12 to increase the bend strength of the pipe saddle in the longitudinal and transverse directions. The illustrated embodiment includes a keel rib 50, a perimeter (flange) rib 52, transverse or orthogonal ribs 54, angular ribs 56, and strut S bearing ribs 58, each being generally thin, elongate, and extending laterally outward from the exterior surface of the saddle body 12. One or all of the ribs (as in the illustrated embodiment) may be integrally formed with the saddle body 12. For example, the ribs may be integrally formed through a molding process.

The keel rib 50 is generally linear and runs longitudinally along the bottom longitudinal axis BL of the bottom wall portion 15. Recesses 62 in the keel rib 50 at the opposite longitudinal end portions 13 are circumferentially aligned with the respective recesses 22 in the upper end of the saddle body 12 to receive and capture corresponding straps. The lower extent of the lower edge of the keel rib 50 is generally constant along the saddle body 12, except adjacent the longitudinal ends, so that a majority of the lower edge of the keel rib lies substantially in a plane that is parallel to the bottom portion of the saddle body. The keel rib 50 includes a first keel portion on a first side of the support clip 26 and a second keel portion on a second side of the support clip. The lower edge of the first keel portion is generally planar with the lower end of the upper lip 34 to facilitate sliding reception of the strut S into the clip 26. The second keel portion extends longitudinally from the gusset rib 44 and generally in the same longitudinal plane. Longitudinal end portions of the keel rib 50 extend upward toward the saddle body 12 at an angle relative to the bottom wall portion to form a generally obtuse angle with the respective longitudinal ends of the saddle body. These opposite angled lower edges of the keel rib 50 allow the pipe saddle 10 to slide under the strut S between the lower portion of pipe P and the upper side of the strut and ride along the strut.

The perimeter rib 52, formed as a flange, extends along the upper ends of the side wall portions 30 and the opposite longitudinal ends. The perimeter rib 52 is generally continuous along the ends. The perimeter rib 52 increases the overall bend strength of the pipe saddle 10 and the bend strength of the individual side wall portions 16.

The illustrated pipe saddle 10 includes a plurality (e.g., eight) of the orthogonal ribs 54 spaced apart from one another along the length L1 of the saddle body 12. The orthogonal ribs 54 extend around the saddle body 12 in a plane that is generally transverse (i.e., orthogonal) to the length L1 of the saddle body. In the illustrated embodiment, some (e.g., four) of the orthogonal ribs 54 are generally U-shaped and are aligned and continuous with and interconnect the recesses 22 in the upper ends of the respective side wall portions 16 and the recesses 62 in the first and second portions of the keel rib 50 to define tracks that receive and capture the straps.

The illustrated orthogonal ribs 54 also include inner and outer orthogonal ribs 54a, 54b, respectively, on the intermediate longitudinal portion 14 of the saddle body 12. The outer orthogonal ribs 54b extend between the upper ends of the saddle body 12 (e.g., the perimeter rib 52 at the upper ends of the opposing side wall portions 16) and intersect the keel rib 50 at a generally orthogonal angle such that the outer intermediate orthogonal ribs extend between and interconnect the perimeter rib at the upper ends of the side walls and the keel rib. The shapes of the outer intermediate orthogonal ribs 54b generally correspond to the cross-sectional shape of the saddle body (e.g., U-shaped). The outer intermediate orthogonal ribs 54b are generally symmetrical about the mid-length transverse plane TP of the saddle body. The outer intermediate orthogonal ribs 54b primarily provide structural rigidity to the saddle body 12, particularly its bend strength.

Figure 3:
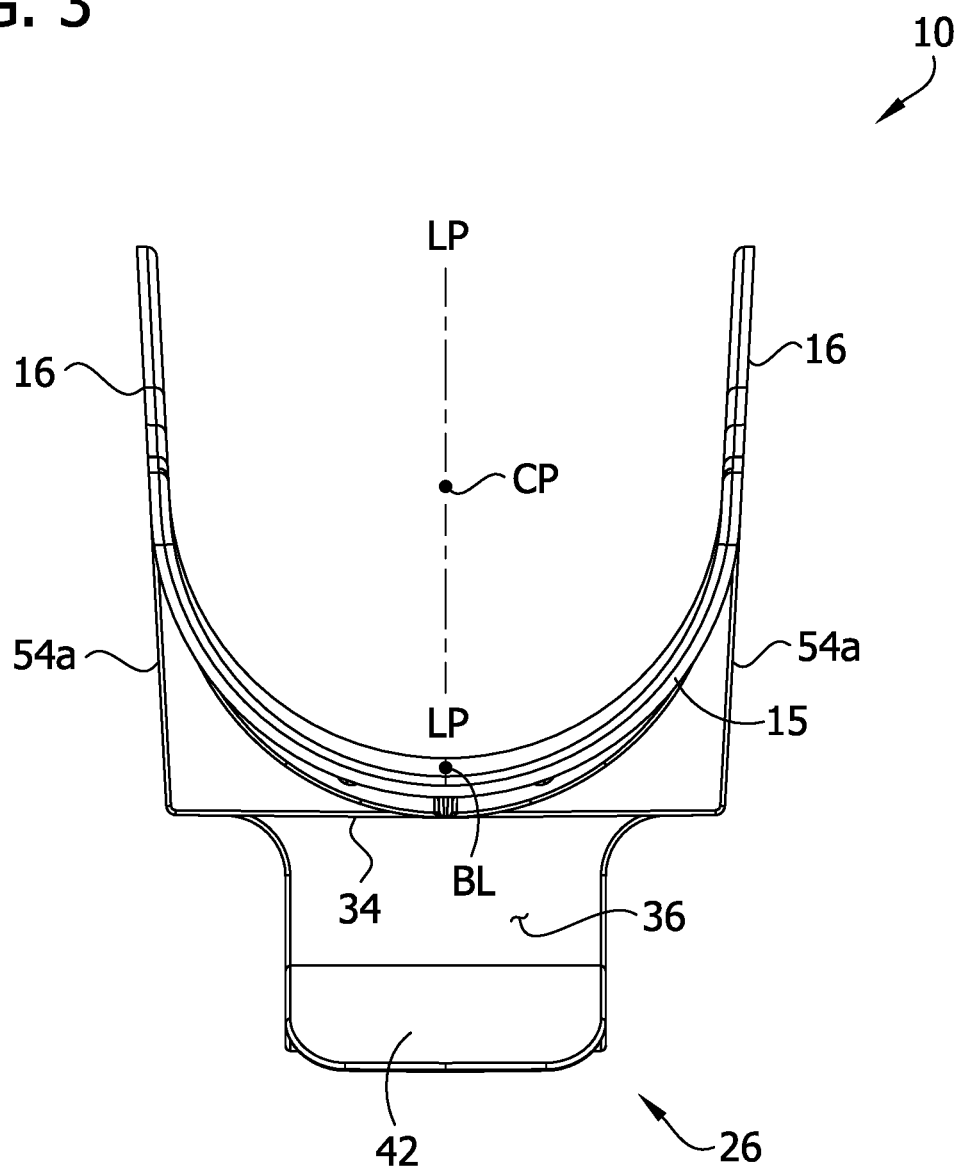
FIG. 3 is a first longitudinal end view of the pipe saddle.
Figure 4:
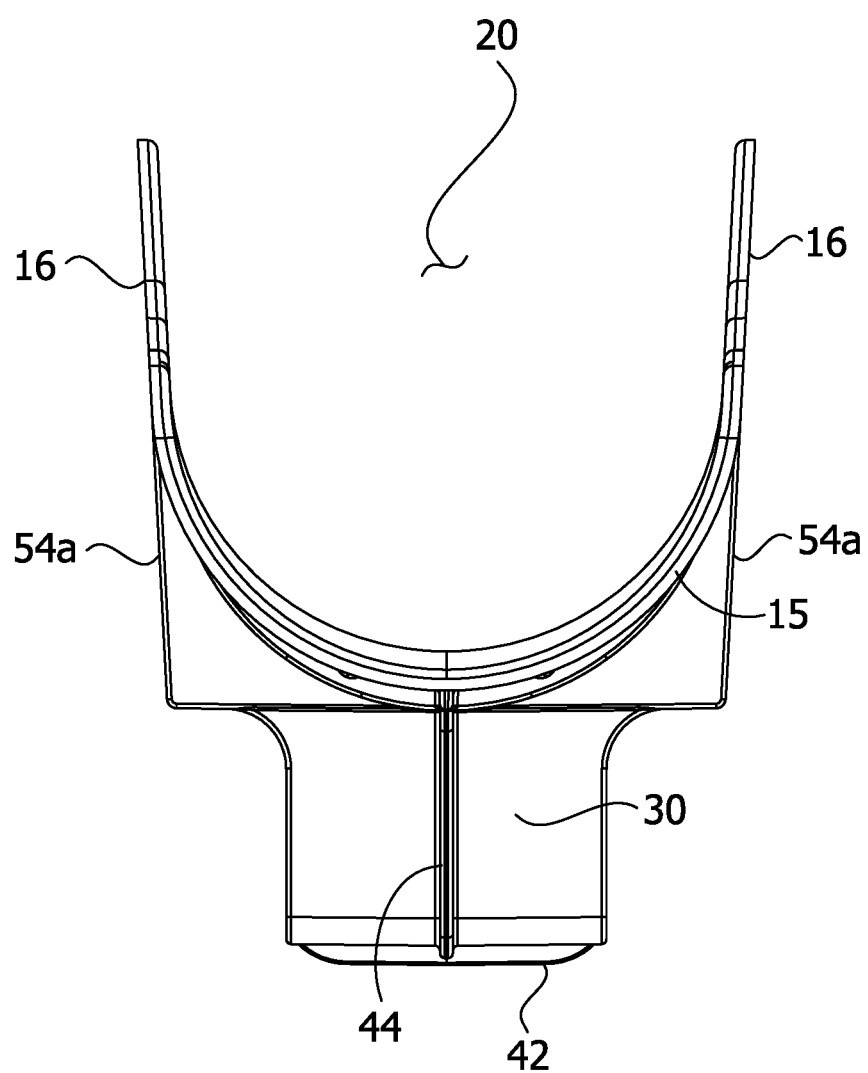
FIG. 4 is a second longitudinal end view of the pipe saddle.

The illustrated pipe saddle 10 includes four inner intermediate orthogonal ribs 54a: two lip ribs on either side of the saddle body; and two side wall ribs on either side of the saddle body. The two lip ribs 54a are aligned heightwise with the upper lip 34 of the clip 26. The lip ribs 54a extend between the upper ends of the saddle body 12 (e.g., the perimeter rib 52 at the upper ends of the opposing side wall portions 16) and the upper lip 34 and are generally continuous with the upper lip. Each lip rib 54a has a lateral outer edge that is generally tangent with the corresponding side wall portion 16 of the saddle body 12 and extends generally linearly downward such that the lateral outer edge does not curve or arc and does not follow the shape of the bottom wall portion 15 of the saddle body (FIG. 3). The two side wall ribs 54a are generally aligned heightwise with the side wall 30 of the clip 26. The side wall ribs 54a extend between the upper ends of the saddle body 12 (e.g., the perimeter rib 52 at the upper ends of the opposing side wall portions 16) and the side wall 30 of the clip 26 and are generally continuous with the side wall. Each side wall rib 54a has a lateral outer edge that is generally tangent with the corresponding side wall portion 16 of the saddle body 12 and extends generally linearly downward such that the lateral outer edge does not curve or arc and does not follow the shape of the bottom wall portion 15 of the saddle body (FIG. 4). The lip and side wall ribs 54a provide structural support to the clip 26 to provide shearing strength to the clip, such as when the clip is slid onto the strut S and when supporting the pipe P on the strut.

In the illustrated embodiment, the angular ribs 56 are on either side of the pipe saddle 10 relative to the longitudinal plane LP passing through the bottom longitudinal axis BL. As shown generally in FIG. 5, the pattern of the angular ribs 56 is substantially mirror image of one another about the longitudinal plane LP. Moreover, the pattern of the angular ribs 56 is substantially mirror image of one another about the mid-length transverse plane TP. In general, each of the angular ribs 56 is enclosed by the perimeter rib 52, at least one orthogonal rib 54, and the keel rib 50. In the illustrated embodiment, the angular ribs 56 comprise: upper-end-to-keel angular ribs having lengths extending from and interconnecting the upper end of one of the side wall portions 16 to the keel rib 50; and upper-end-to-transverse-rib extending from and interconnecting the upper end of one of the side wall portions to one of the orthogonal ribs 54 (e.g., rib 54b). At least a longitudinal portion of the each of the illustrated angular ribs 56 extends at a non-orthogonal angle relative to the longitudinal axis of the saddle body (i.e., at an angle and not parallel to the mid-length transverse plane TP) and a non-orthogonal angle relative to the mid-length transverse plane. As an example, at least an angular longitudinal portion of each of the angular ribs may extend at an acute angle relative to the mid-length transverse plane TP, such as an angle of between about 5 degrees and about 85 degrees, or from about 10 degrees to about 75 degrees, or from about 30 degrees to about 60 degrees, or about 45 degrees. In the illustrated embodiment, the angular ribs 56 extend from adjacent the upper end of one of the side wall portions 16 downward and toward the mid-length transverse plane TP of the pipe saddle 10. In the illustrated embodiment, each angular rib 56 has a lower longitudinal portion that is curved or arcuate. In one embodiment, the entire angular rib 56 may be curved or arcuate. Moreover, the illustrated angular longitudinal portion curves from a lower end of an upper linear longitudinal portion of the angular rib 56. The upper linear longitudinal portion also extends at an angle to the mid-length transverse plane TP. The angular longitudinal portion of each angular rib 56 resists and reduces the deflection of the opposite longitudinal ends of the saddle body 12.

The illustrated strut-bearing ribs 58 are on either side of the pipe saddle 10 relative to the longitudinal plane LP passing through the bottom longitudinal axis BL. The pipe saddle 10 includes four strut-bearing ribs 58: a first pair on one side of the saddle body; and a second pair on the other side of the saddle body. Each of the pairs of strut-bearing ribs 58 is disposed longitudinally between the lip rib 54a and side wall rib 54a on the corresponding side of the saddle body 12. The strut bearing ribs 58 are connected to and extend generally upward from the upper wall 28 of the support clip 26. The junctures of the respective strut-bearing ribs 58 and the upper wall 28 of the support clip 26 are generally vertically aligned with (e.g., lie in the same transverse plane as) the upper lips UL of the strut S when the clip is secured to the strut, as shown generally in FIGS. 6 and 7. Outer lateral edges of the strut-bearing ribs 58 are generally tangent with the corresponding side wall portion 16 of the saddle body 12 (and coplanar with the corresponding lip rib 54a and corresponding side wall rib 54a). That is, the lateral outer edges do not curve or arc and do not follow the shape of the bottom wall portion 15 of the saddle body 12 (FIG. 1). In the illustrated embodiment, the strut-bearing ribs 58 are curved and generally convex toward the mid-length transverse plane TP. The strut-bearing ribs 58 in one of the pairs meet a mid-length transverse rib 64 and one another (i.e., converge) at a node at the mid-length transverse plane TP. The mid-length transverse rib 64 extends from and interconnects the node and the perimeter rib 52 at the upper end of the corresponding side wall portion 16 of the saddle body 12.

Referring to FIGS. 8-13, additional embodiments of a pipe saddle are illustrated that are similar to the pipe saddle 10 described above. In general, the pipe saddles 10, 10', 10" are generally the same and differ in the diameters of the pipes that they are configured to receive and support. The lengths of the pipe saddles 10, 10', 10" are identical. Moreover, the support clips 26, 26', 26" are also identical, other than the transverse widths of the upper lips 34, 34', 34". In general, the features that are variable depending on the diameter of the pipe to be supported include the height of the saddle body, the width/radius of the saddle body, and the lengths of the ribs. Accordingly, the shape and look of the different sizes of pipe saddles are substantially similar.

Referring to FIGS. 14-17, another embodiment of a pipe saddle is generally indicated at reference numeral 110. Like the previously described pipe saddle 10, the illustrated pipe saddle 110 comprises a saddle body, generally indicated at 112, having opposite first and second longitudinal ends, a length L2 extending between the first and second longitudinal ends, opposite longitudinal end portions 113, and an intermediate longitudinal portion 114 between the longitudinal end portions 113. As described herein below, the saddle 110 is similar to the saddle 10, other than as hereinafter described. In particular, the opposite longitudinal end portions 113 are identical to the opposite longitudinal end portions 13 of the saddle 10. Accordingly, the teachings set forth above with respect to the longitudinal end portions 13 of the saddle 10 apply to the longitudinal end portions 113 of the present saddle 110 and the same features are indicated by corresponding references numerals. The intermediate longitudinal portion 114 of the saddle 110 is different from the intermediate longitudinal portion of the saddle 10. In particular, the intermediate longitudinal portion 114 is configured to be attached to another type of support, such as a clevis hanger or other type of hanger H for suspending the pipe saddle 110 and the pipe P from a ceiling or other structure.

The intermediate longitudinal portion 114 includes outer orthogonal ribs 154b that may be similar to the outer orthogonal ribs 54b of the pipe saddle 10. The outer orthogonal ribs 154b extend between the upper ends of the saddle body 112 (e.g., the perimeter rib 152 at the upper ends of the opposing side wall portions 116) and intersect the keel rib 150 at a generally orthogonal angle such that the outer intermediate orthogonal ribs extend between and interconnect the perimeter rib at the upper ends of the side walls and the keel rib. The shapes of the outer intermediate orthogonal ribs 154b generally correspond to the cross-sectional shape of the saddle body 112 (e.g., U-shaped). The outer intermediate orthogonal ribs 154b are generally symmetrical about the mid-length transverse plane TP2 of the saddle body 112. The outer intermediate orthogonal ribs 54b primarily provide structural rigidity to the saddle body 112, particularly its bend strength.

The intermediate longitudinal portion 114 further includes a pair of longitudinally spaced inner hanger ribs 180a and a pair of longitudinally spaced outer hanger ribs 180b, each of which extend from the upper ends of the side wall portions 116 and around the saddle body 112. The inner hanger ribs 180a are disposed longitudinally between the outer hanger ribs 180b, and extend from a recessed portion 184 of the perimeter rib 152. The inner hanger ribs 180a are generally U-shaped and define a U-shaped track 186 to receive and capture a hanger (e.g., clevis hanger). The outer hanger ribs 180b are generally U-shaped and include flat bottom portions adjacent the bottom wall portion 115 of the saddle body 112.

A support retainer, generally indicated at 188, is coupled to the intermediate longitudinal portion 114 at the bottom wall portion 116 thereof. The illustrated retainer 188 comprises a strap 190 extending generally longitudinally along the bottom of the saddle body 112. The strap 190 has a convex intermediate longitudinal portion extending upward toward the bottom wall portion 115. The strap 190 has an attached end connected to and depending from the intermediate longitudinal portion 114 and the keel rib 150, and a free end that is selectively attachable to the saddle body 112. The strap 190 is resiliently deflectable at the attached end about a flexible hinge, such as a living hinge, having an axis transverse to the longitudinally axis of the saddle body 112. The free end of the strap 190 is selectively attachable to the saddle body 112 via a snap latch. The snap latch includes a resiliently deflectable snap hook 192 extending upward from the strap adjacent the free end of the strap, and a generally rigid catch 194 depending from the bottom wall portion 115 of the intermediate longitudinally portion 114. The snap hook 192 is selectively attachable to the catch 194. The free end of the strap 190 has a forked portion 196 defining a notch or groove for receiving the keel rib 150 when the snap latch is secured. This inhibits the strap 190 from move laterally when it is closed, to inhibit the snap latch from becoming unsecured inadvertently.

Figure 14:
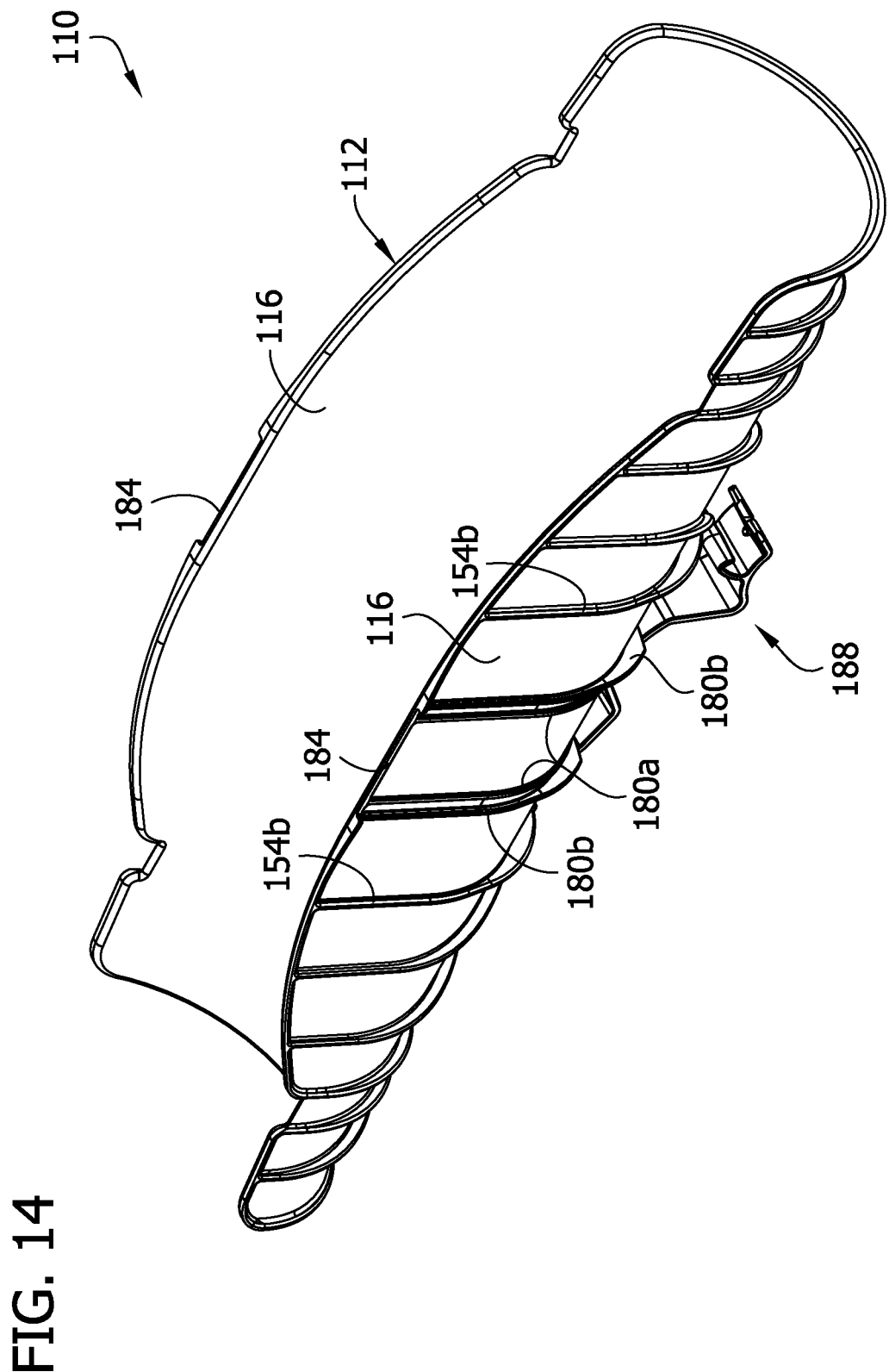
FIG. 14 is a perspective of a second embodiment of a pipe saddle.
Figure 15:
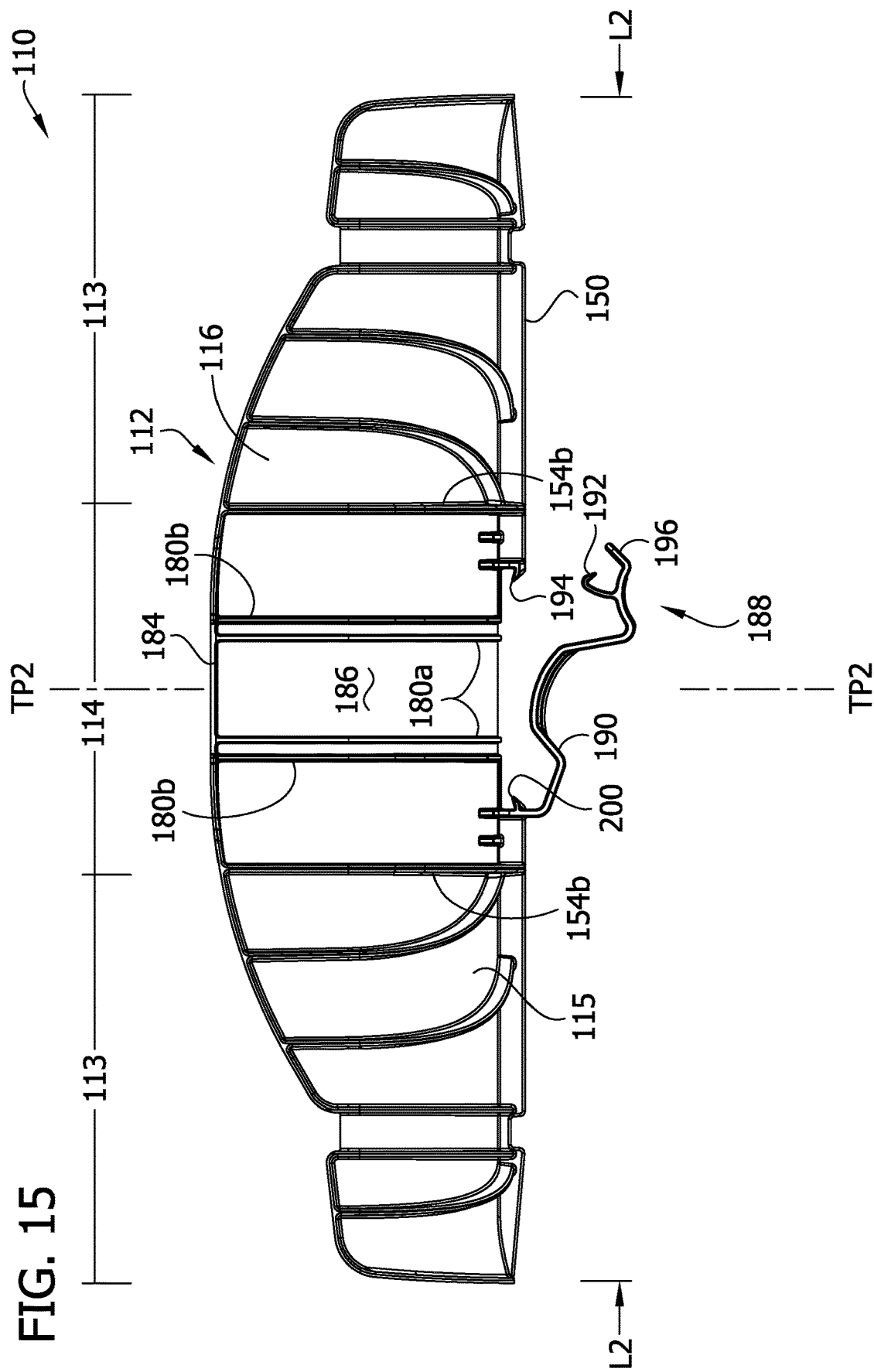
FIG. 15 is a side view of the pipe saddle.
Figure 16:
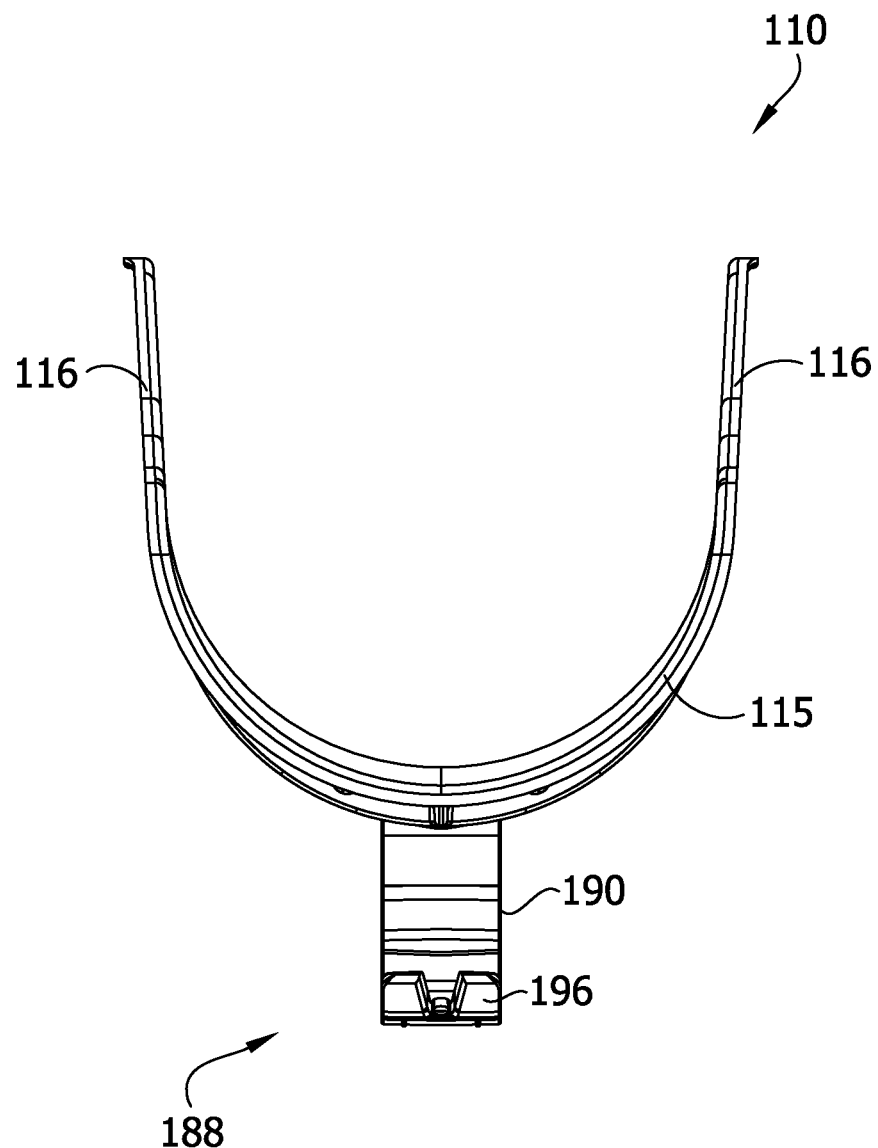
FIG. 16 is a first longitudinal end view of the pipe saddle.
Figure 17:
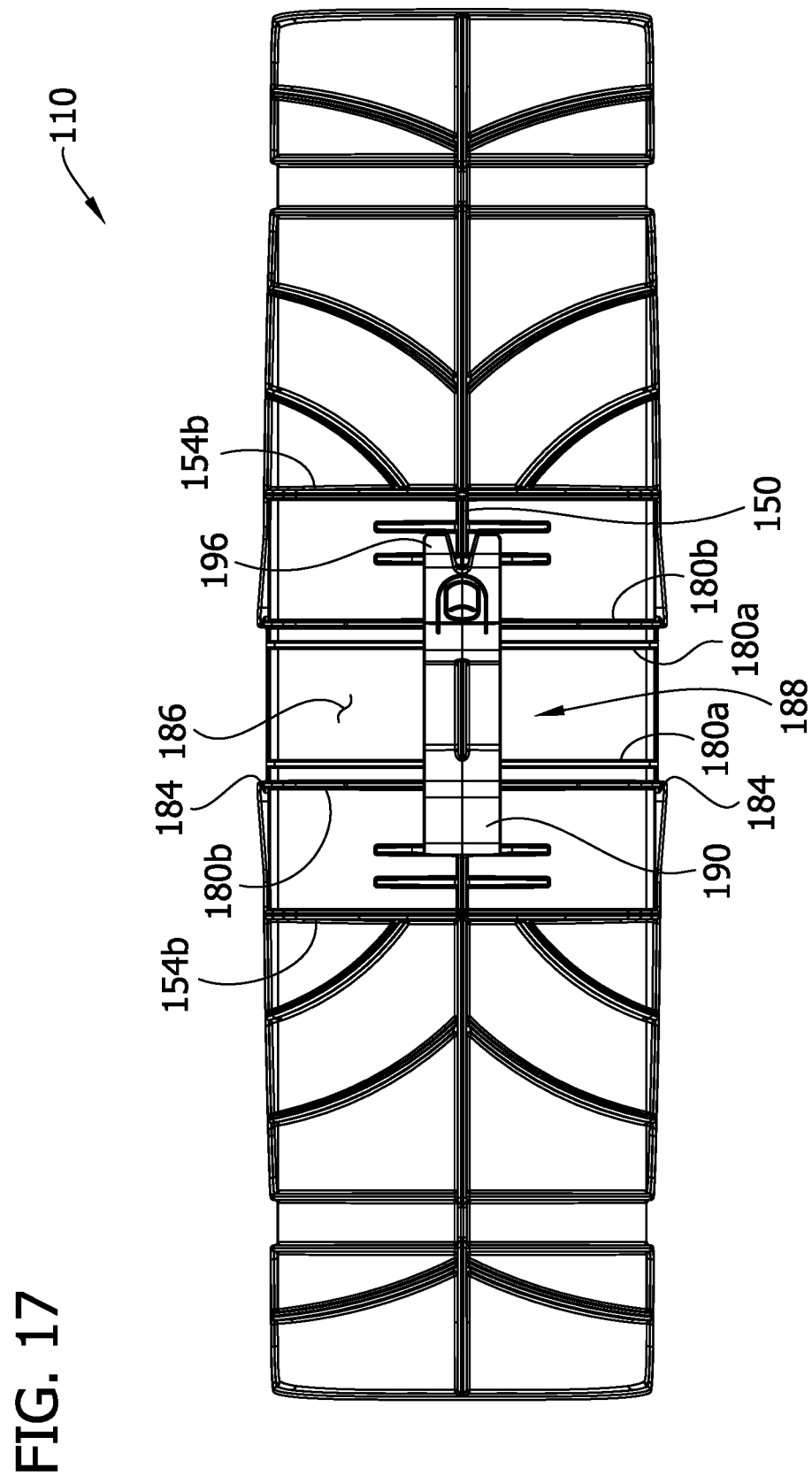
FIG. 17 is a bottom plan view of the pipe saddle.
Figure 18:
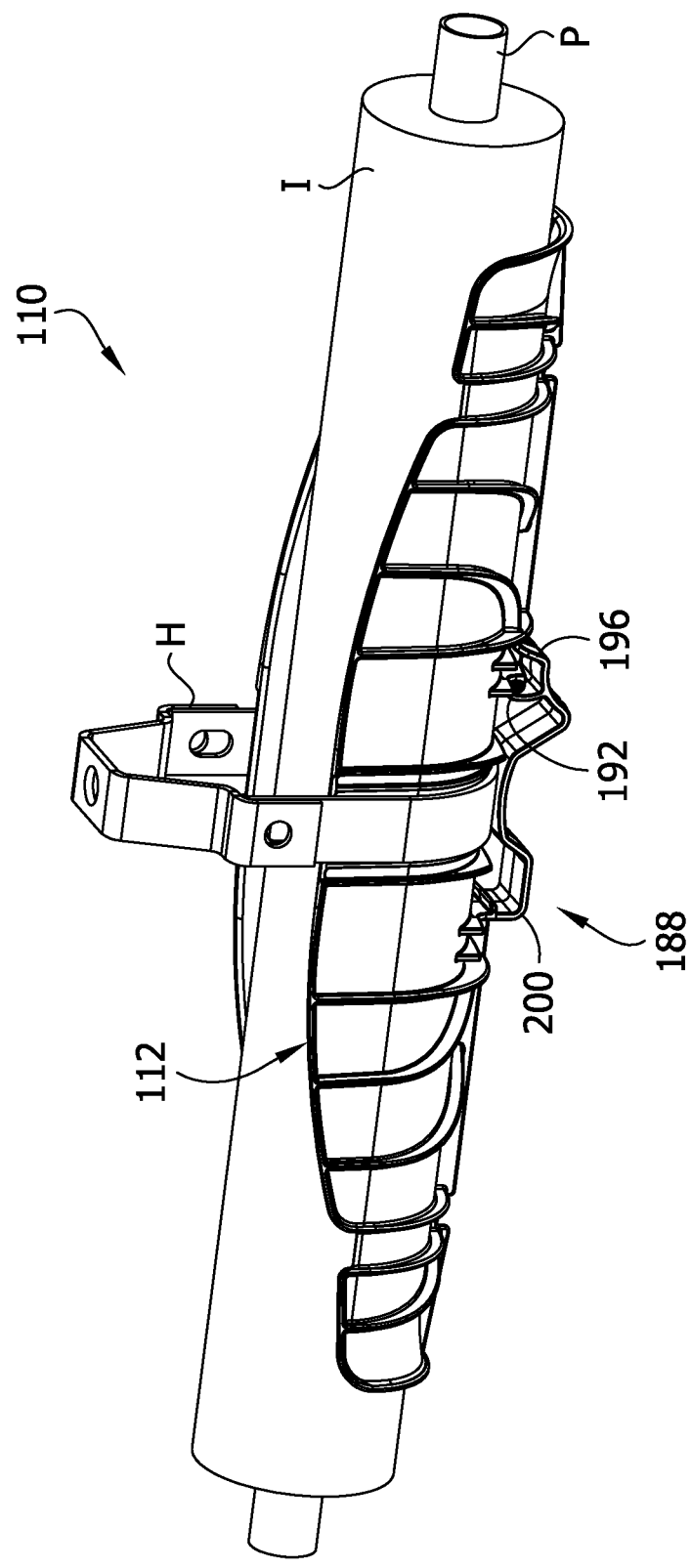
FIG. 18 is a perspective of the pipe saddle attached to a hanger and supporting an insulated pipe.
Figure 19:
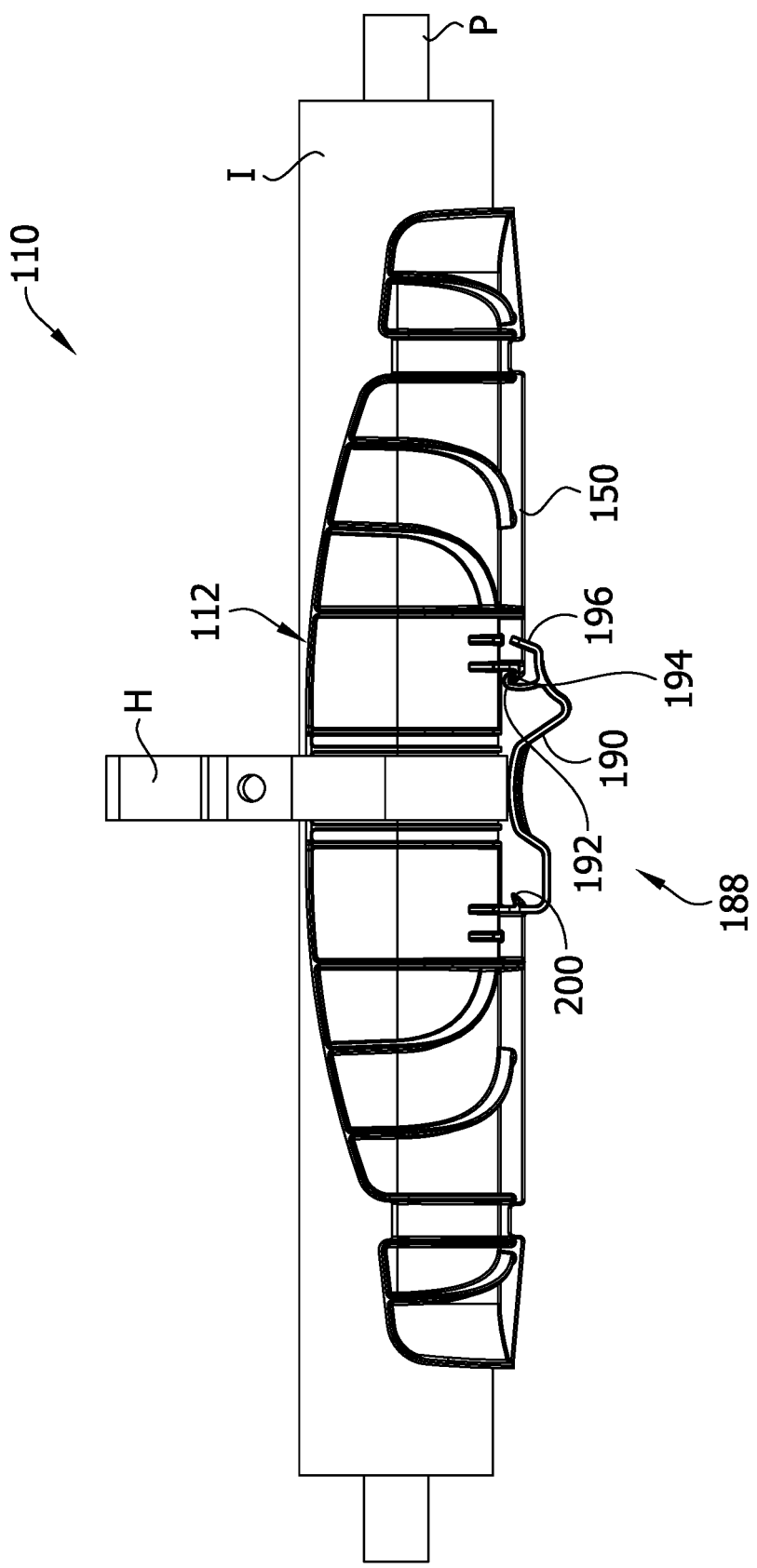
FIG. 19 is a side view of the pipe saddle attached to a hanger and supporting an insulated pipe.
Figure 20:
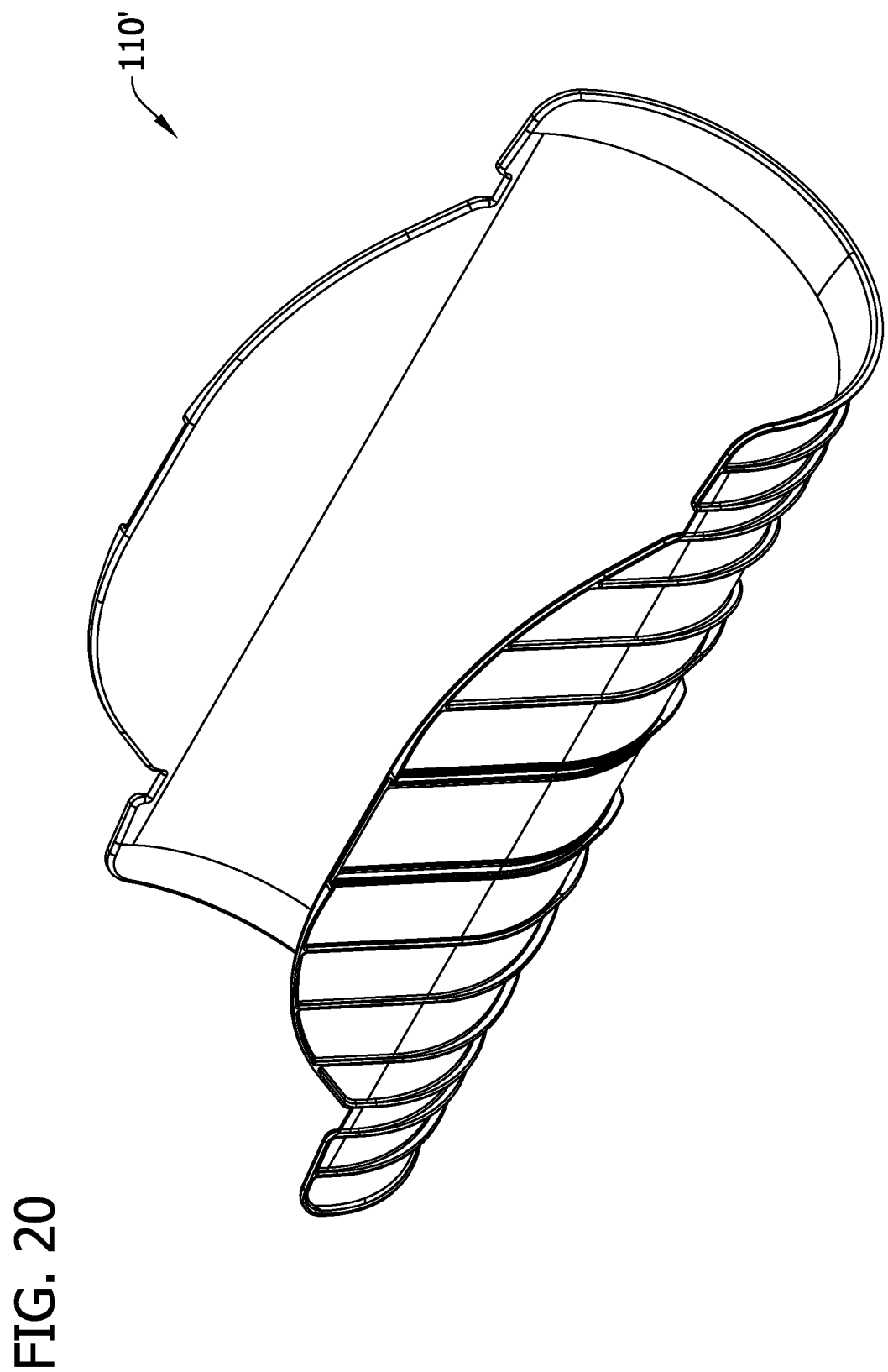
FIG. 20 is a perspective of a first variation of the second embodiment of the pipe saddle for supporting a pipe of a different diameter.
Figure 21:
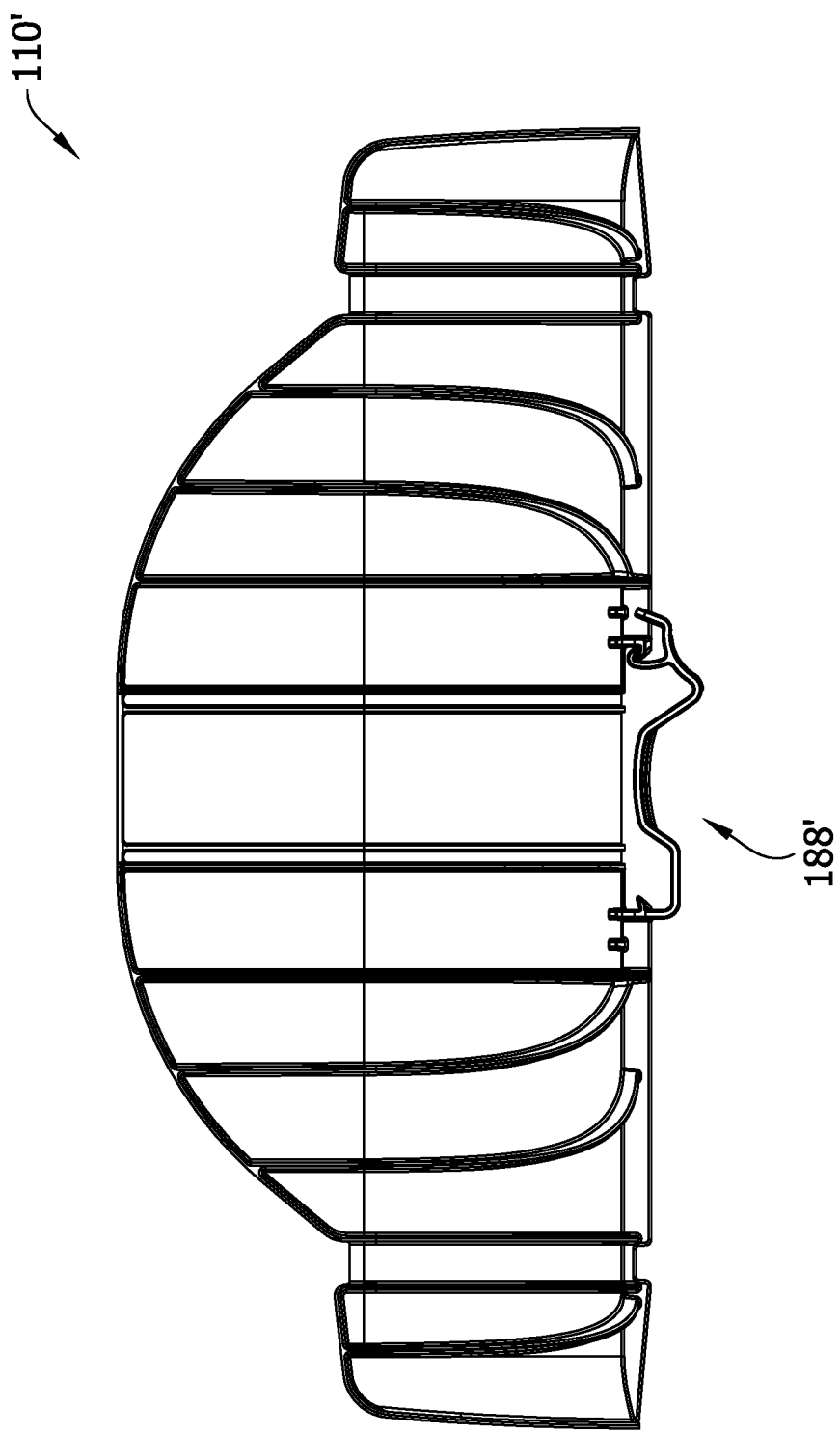
FIG. 21 is a side of the first variation.
Figure 22:
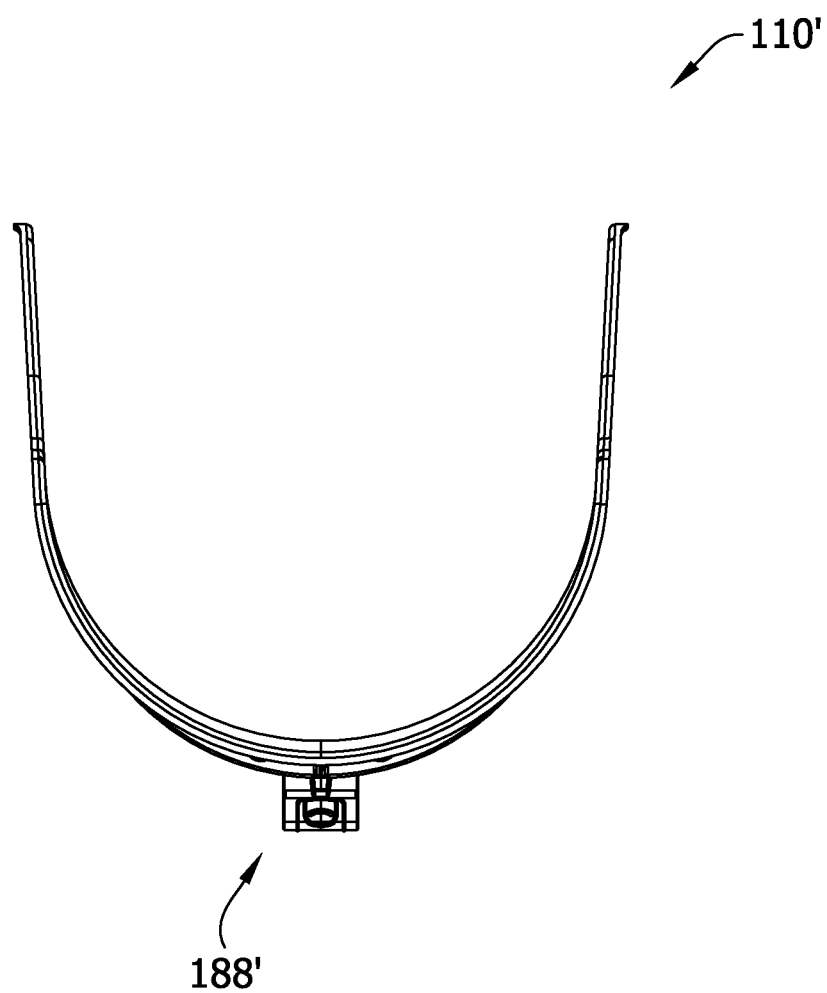
FIG. 22 is a longitudinal end view of the first variation.
Figure 23:
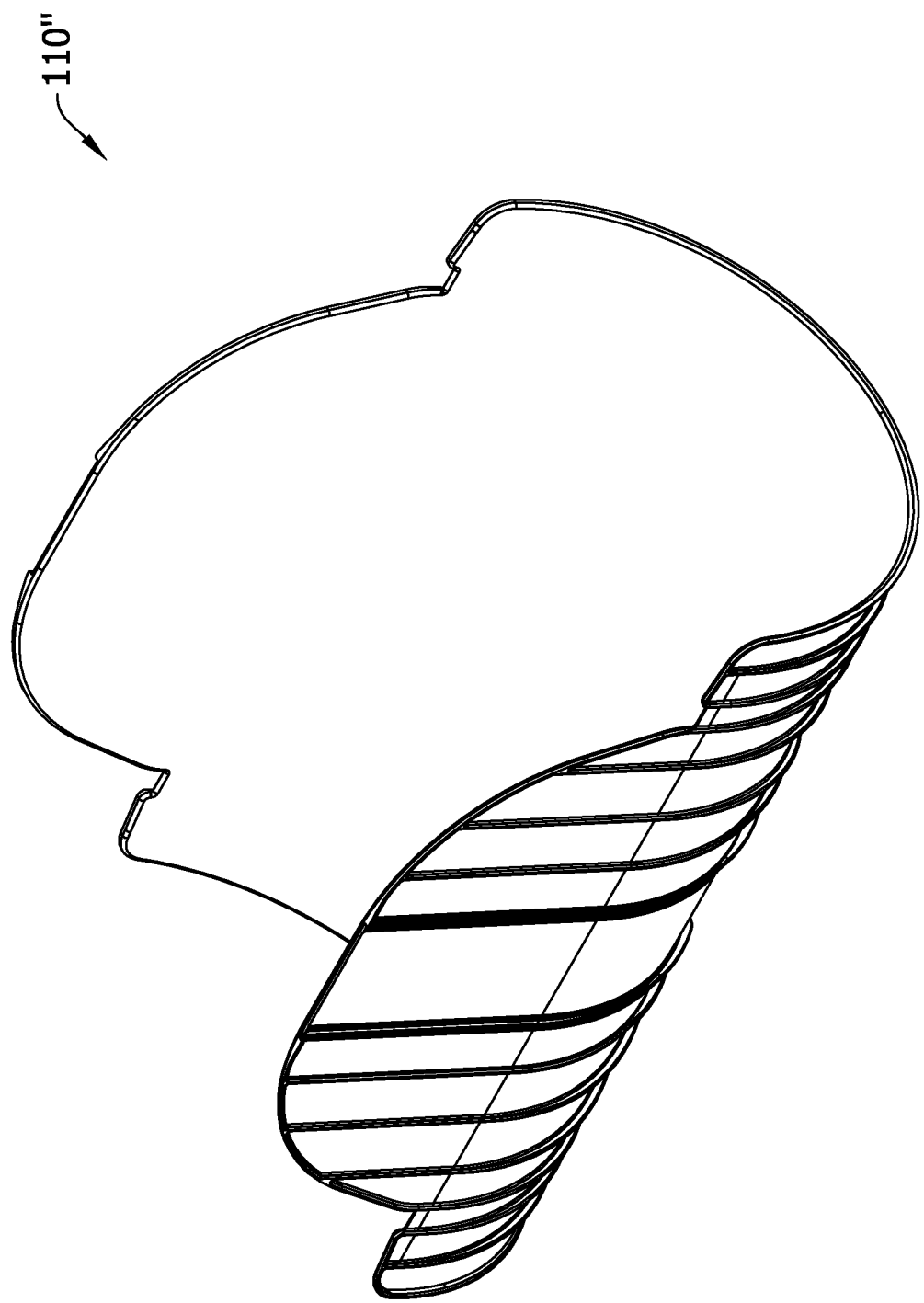
FIG. 23 is a perspective of a second variation of the second embodiment of the pipe saddle for supporting a pipe of a different diameter.
Figure 24:
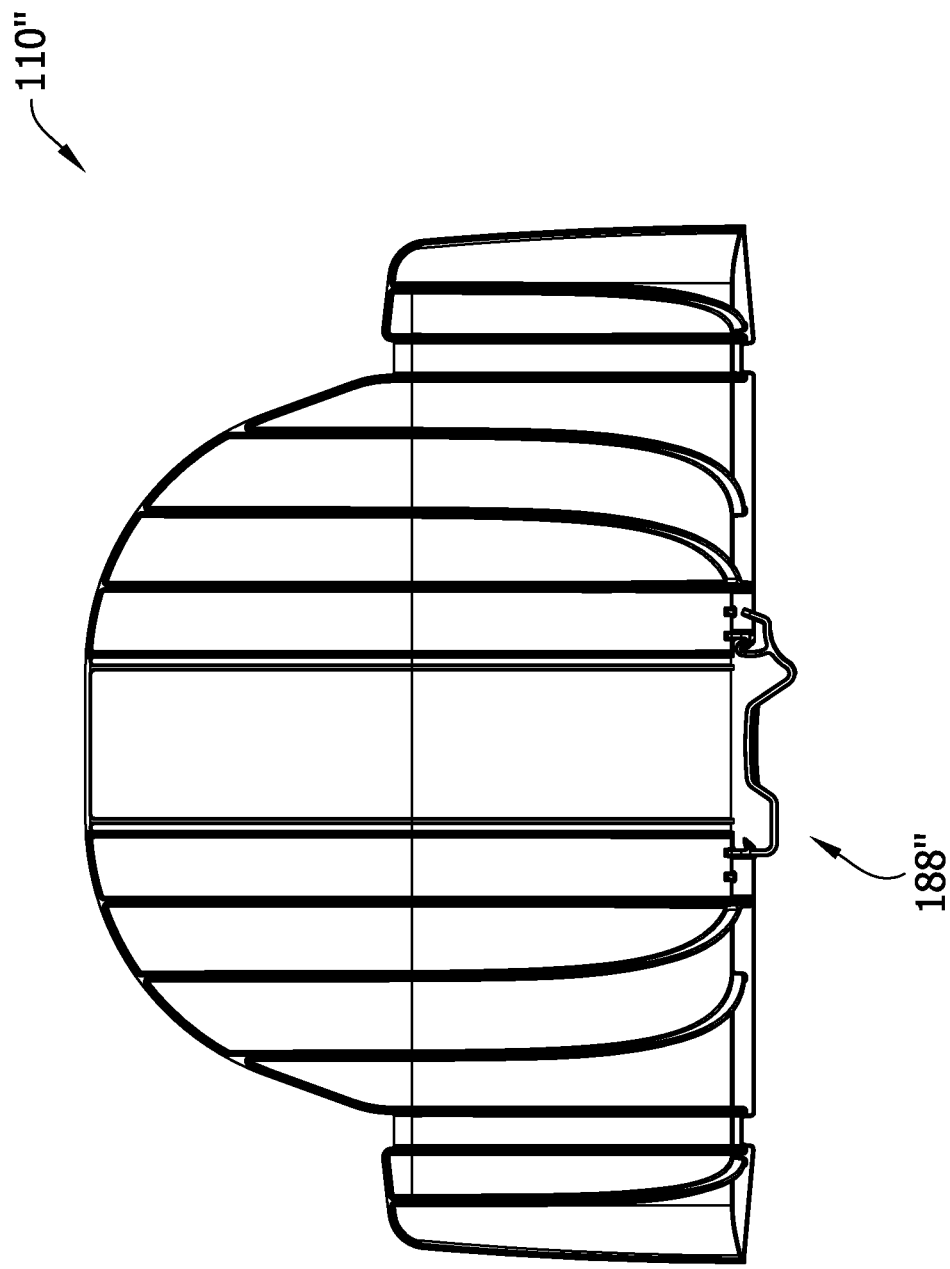
FIG. 24 is a side of the second variation.
Figure 25:
FIG. 25 is a longitudinal end view of the second variation.

In use, a hanger H (e.g., a clevis hanger) or other type of support may be secured to the pipe saddle 110 (FIG. 18). For example, a band of the hanger may be received on the intermediate longitudinal portion 114 when the support retainer 188 is in the open position, as shown in FIGS. 14 and 15. In one example, the band may be received in the track 186. The support retainer 188 may then be pivoted to the closed position, as shown in FIGS. 18 and 19, so that the snap latch is secured. In the closed, secured position, the convex intermediate portion of the strap 190 engages the hanger H (e.g., clevis hanger) and captures the hanger in the track 186 to retain the position of the hanger on the pipe saddle 110.

In the illustrated embodiment, a second catch 200 (or flange) extends from the attached end of the strap 190 toward the rigid catch 194. The second catch 200 is spaced from the bottom wall portion 115 of the saddle body 112 a same distance as the rigid catch 194. Each of the catches 194, 200, together with the bottom wall portion 115, defines a groove extending transverse to the longitudinal axis of the saddle body 112. The grooves are configured to receive ends or flanges of a support (e.g., a flat plate or flanges of an I-beam) to attach the pipe saddle 110 to the support. The flat bottom portions of the outer intermediate orthogonal ribs 154b may lie flat on the support when the support is received in the grooves. In one embodiment, the strap 190 may be removed from the saddle body 112 such as by cutting the strap generally at the flexible hinge.

Referring to FIGS. 20-25, additional embodiments of the pipe saddle are illustrated that are similar to the pipe saddle 110 described above. In general, the pipe saddles 110, 110', 110" are generally the same and differ in the diameters of the pipes that they are configured to receive and support. The lengths of the pipe saddles 110, 110', 110" are identical. Moreover, the support retainers 188, 188', 188" are also identical. In general, the features that are variable depending on the diameter of the pipe to be supported include the height of the saddle body, the width/radius of the saddle body, and the lengths of the ribs. Accordingly, the shape and look of the different sizes of pipe saddles 110, 110', 110" are substantially similar.

Each pipe saddle 10, 110 (and the different sizes thereof) may be integrally formed as a one-piece monolithic component. In one embodiment, the pipe saddles may be molded from a plastic material. In one exemplary method, a mold may include a male core portion that forms the smooth interior surface of the saddle body. A fixed female portion of the mold forms the exterior of the longitudinal end portions. An interchangeable slide portion of the mold forms the exterior of the intermediate longitudinal portion. A first slide portion forms the exterior of the intermediate longitudinal portion of the first pipe saddle, while a second slide portion that is interchangeable with the first slide portion, forms the exterior of the intermediate longitudinal portion of the second pipe saddle. Accordingly, it can be understood that the only the interchangeable slide portion changes, depending on the type of pipe saddle to be molded.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

OTHER STATEMENTS OF THE INVENTION

The present disclosure is directed to the described features, in combination or individually, in the following statements. Although some of the following statements are not currently presented as claims, the statements are believed to be patentable and may subsequently be presented as claims. Associated methods, such as methods corresponding to statements of apparatus or systems below, are also believed to be patentable and may subsequently be presented as claims. It is understood that the following statements may refer to and be supported by one, more than one, or all of the embodiments described above. The following statements are not an exhaustive list of features, as additional features are described above and shown in the illustrated embodiments.

A1. A pipe saddle comprising: a saddle body having an interior surface with a generally U-shaped cross-sectional shape defining an interior configured to receive a pipe therein, the saddle body including a bottom wall portion; and a support clip on the bottom wall portion of the saddle body, the support clip including a side wall extending downward, and a resiliently deflectable lower arm extending outward from a lower end of the side wall and generally opposing the bottom wall portion, the resiliently deflectable lower arm including a catch at a free end thereof, wherein the resiliently deflectable lower arm is configured to snap onto a support structure to attach the pipe saddle to the support structure.

A2. The pipe saddle set forth in feature A1, wherein the support clip further includes an upper wall at the bottom wall portion of the saddle body and generally opposing the resiliently deflectable lower arm, the side wall extending downward from one end of the upper wall.

A3. The pipe saddle set forth in feature A2, wherein the support clip further includes an upper lip extending downward from the upper wall at an end of the upper wall opposite the side wall, wherein the catch and the upper lip generally oppose one another to define a side opening of the support clip.

A4. The pipe saddle set forth in feature A3, wherein interior surfaces of the side wall, the resiliently deflectable lower arm, the upper wall, and the upper lip define the interior of the support clip in communication with the side opening of the support clip.

A5. The pipe saddle set forth in feature A4, wherein the interior surfaces of the side wall, the resiliently deflectable lower arm, the upper wall, and the upper lip are generally planar.

A6. The pipe saddle set forth in feature A5, wherein the support clip is configured to snap onto a strut-type support structure.

A7. The pipe saddle set forth in feature A1, wherein the resiliently deflectable lower arm is cantilevered at a living hinge at the juncture of the resiliently deflectable lower arm and the side wall.

A8. The pipe saddle set forth in feature A7, wherein the resiliently deflectable lower arm extends at an acute included angle from the side wall.

B1. A pipe saddle comprising: a saddle body having an exterior surface, and an interior surface with a generally U-shaped cross-sectional shape defining an interior configured to receive a pipe therein, and a longitudinal axis extending between opposite longitudinal ends; at least one angular rib on the exterior surface of the saddle body, the at least one angular rib having a length extending between opposite upper and lower ends of the rib, wherein at least an angular longitudinal portion of the at least one angular rib extends at an angle relative to a mid-length transverse plane extending transversely relative to the longitudinal axis at a mid-length of the saddle body.

B2. The pipe saddle set forth in feature B1, wherein said at least an angular longitudinal portion of the at least one angular rib has a curved longitudinal portion.

B3. The pipe saddle set forth in feature B1, wherein said at least an angular longitudinal portion of the at least one angular rib has a linear longitudinal portion.

B4. The pipe saddle set forth in feature B1, wherein the pipe saddle further comprises at least one transverse rib on the exterior surface of the saddle body, wherein the at least one transverse rib extends around the saddle body in a transverse plane that is generally transverse to the longitudinal axis of the saddle body.

B5. The pipe saddle set forth in feature B4, wherein the at least one angular rib intersects the transverse rib.

B6. The pipe saddle set forth in feature B1, wherein the pipe saddle further comprises a keel rib on the exterior surface of the saddle body, wherein the keel rib extends longitudinally along the bottom wall portion of the saddle body.

B7. The pipe saddle set forth in feature B6, wherein the at least one angular rib intersects the keel rib.

C1. A pipe saddle comprising: a saddle body having an interior surface with a generally U-shaped cross-sectional shape defining an interior configured to receive a pipe therein, the saddle body including a bottom wall portion and having a length extending between first and second ends of the saddle body; a support clip on the bottom wall portion of the saddle body and including an upper wall having longitudinal ends spaced apart along the length of the saddle body, the support clip configured to snap onto a channel strut to attach the pipe saddle to the channel strut; and first and second strut-bearing ribs on the exterior surface of the saddle body, wherein the first and second strut-bearing ribs intersect the upper wall of the support clip and extend upward therefrom, wherein the first and second strut-bearing ribs intersect the upper wall at respective first and second support locations that are spaced apart from one another and from ends of the upper wall, wherein the first and second support locations overlie respective first and second upper lips of the channel strut when the support clip is attached to the channel strut.

C2. The pipe saddle set forth in feature C1, wherein the first and second strut-bearing ribs curved upward from the upper wall of the support clip.

C3. The pipe saddle set forth in feature C2, wherein the first and second strut-bearing ribs converge at a node spaced apart from the upper wall of the support clip.

C4. The pipe saddle set forth in feature C2, further comprising a mid-length transverse rib extending upward from the node.

D1. A pipe saddle comprising: a saddle body having an interior surface with a generally U-shaped cross-sectional shape defining an interior configured to receive a pipe therein, the saddle body including a bottom wall portion and having a longitudinal axis extending between opposite longitudinal ends of the saddle body; and a support retainer on the bottom wall portion of the saddle body, the support retainer including a retainer strap having an attached end connected to the bottom wall portion and a free end selectively attachable to the saddle body via a snap latch, the support retainer configured to capture a band of a hanger between the saddle body and the retainer strap.

D2. The pipe saddle set forth in feature D1, wherein the retainer strap is resiliently deflectable about a living hinge at the attached end of the retainer strap.

D3. The pipe saddle set forth in feature D1, wherein the snap latch includes a snap hook at the free end of the retainer strap, and a catch at the bottom wall portion of the saddle body, wherein the snap hook is releasably attachable to the catch.

D4. The pipe saddle set forth in feature D1, wherein retainer strap has a convex intermediate portion configured to engage the band of the hanger when the snap latch is secured.

D5. The pipe saddle set forth in feature D1, further comprising a second catch at the attached end of the retainer strap and extending toward the rigid catch, the catch and the second catch are spaced a same distance from the bottom wall portion to define respective grooves extending transverse to the longitudinal axis of the saddle body.

What is claimed is:

1. A pipe saddle comprising:
a saddle body having an interior surface with a generally U-shaped cross-sectional shape defining an interior configured to receive a pipe therein, the saddle body including a bottom wall portion; and
a support clip on the bottom wall portion of the saddle body, the support clip including
a side wall extending downward relative to the bottom wall portion,
a resiliently deflectable lower arm extending outward from a lower end of the side wall and generally opposing the bottom wall portion, wherein the resiliently deflectable lower arm is configured to engage a support structure to attach the pipe saddle to the support structure,
a catch at a free end of the resiliently deflectable lower arm, wherein the resiliently deflectable lower arm is configured to snap onto the support structure,
an upper lip extending downward relative to the bottom wall portion, wherein the catch and the upper lip generally oppose one another to define a side opening of the support clip.

2. The pipe saddle set forth in claim 1, wherein the support clip further includes an upper wall at the bottom wall portion of the saddle body and generally opposing the resiliently deflectable lower arm, the side wall extending downward from one end of the upper wall.

3. The pipe saddle set forth in claim 2, wherein the upper lip extends downward from the upper wall at an end of the upper wall opposite the side wall.

4. The pipe saddle set forth in claim 3, wherein interior surfaces of the side wall, the resiliently deflectable lower arm, the upper wall, and the upper lip define the interior of the support clip in communication with the side opening of the support clip.

5. The pipe saddle set forth in claim 4, wherein the interior surfaces of the side wall, the resiliently deflectable lower arm, the upper wall, and the upper lip are each generally planar.

6. The pipe saddle set forth in claim 5, wherein the support structure onto which the support clip is configured to snap has a rectangular cross section.

7. The pipe saddle set forth in claim 1, wherein the resiliently deflectable lower arm is resiliently deflectable along generally its entire length.

8. The pipe saddle set forth in claim 7, wherein the resiliently deflectable lower arm extends at an acute included angle from the side wall.

9. A pipe saddle comprising:
a saddle body having an exterior surface, and an interior surface with a generally U-shaped cross-sectional shape defining an interior configured to receive a pipe therein, and a longitudinal axis extending between opposite longitudinal ends; and
at least one angular rib on the exterior surface of the saddle body, the at least one angular rib having a length extending between opposite upper and lower ends of the rib, wherein at least an angular longitudinal portion of the at least one angular rib extends at an angle relative to a mid-length transverse plane extending transversely relative to the longitudinal axis at a mid-length of the saddle body,
wherein the pipe saddle further comprises at least one transverse rib on the exterior surface of the saddle body, wherein the at least one transverse rib extends around the saddle body in a transverse plane that is generally transverse to the longitudinal axis of the saddle body,
wherein the at least one angular rib intersects the transverse rib.

10. The pipe saddle set forth in claim 9, wherein said at least an angular longitudinal portion of the at least one angular rib has a curved longitudinal portion.

11. The pipe saddle set forth in claim 9, wherein the pipe saddle further comprises a keel rib on the exterior surface of the saddle body, wherein the keel rib extends longitudinally along the bottom wall portion of the saddle body.

12. The pipe saddle set forth in claim 11, wherein the at least one angular rib intersects the keel rib.

13. A pipe saddle comprising:
a saddle body having an interior surface with a generally U-shaped cross-sectional shape defining an interior configured to receive a pipe therein, the saddle body including a bottom wall portion and having a longitudinal axis extending between opposite longitudinal ends of the saddle body; and
a support retainer on the bottom wall portion of the saddle body, the support retainer including a retainer strap having an attached end connected to the bottom wall portion and a free end selectively attachable to the saddle body via a snap latch, the support retainer configured to capture a band of a hanger between the saddle body and the retainer strap.

14. The pipe saddle set forth in claim 13, wherein the retainer strap is resiliently deflectable about a flexible hinge at the attached end of the retainer strap.

15. The pipe saddle set forth in claim 13, wherein the snap latch includes a snap hook at the free end of the retainer strap, and a catch at the bottom wall portion of the saddle body, wherein the snap hook is releasably attachable to the catch.

16. The pipe saddle set forth in claim 13, wherein retainer strap has a convex intermediate portion configured to engage the band of the hanger when the snap latch is secured.

17. The pipe saddle set forth in claim 13, further comprising a second catch at the attached end of the retainer strap and extending toward the catch, the catch and the second catch are spaced a same distance from the bottom wall portion to define respective grooves extending transverse to the longitudinal axis of the saddle body.

* * * * *